United States Patent
Fisker et al.

(10) Patent No.: US 11,160,642 B2
(45) Date of Patent: Nov. 2, 2021

(54) DESIGNING AN INSERTABLE DENTAL RESTORATION

(71) Applicant: 3Shape A/S, Copenhagen K (DK)

(72) Inventors: Rune Fisker, Virum (DK); Sven Nonboe, Hillerød (DK)

(73) Assignee: 3SHAPE A/S, Copenhagen K (DK)

( * ) Notice: Subject to any disclaimer, the term of this patent is extended or adjusted under 35 U.S.C. 154(b) by 1071 days.

(21) Appl. No.: 14/398,601

(22) PCT Filed: May 2, 2013

(86) PCT No.: PCT/EP2013/059161
§ 371 (c)(1),
(2) Date: Nov. 3, 2014

(87) PCT Pub. No.: WO2013/164410
PCT Pub. Date: Nov. 7, 2013

(65) Prior Publication Data
US 2015/0150660 A1    Jun. 4, 2015

Related U.S. Application Data

(60) Provisional application No. 61/642,230, filed on May 3, 2013, provisional application No. 61/723,902, filed on Nov. 8, 2012.

(30) Foreign Application Priority Data

May 3, 2012  (DK) .......................... PA 2012 70228

(51) Int. Cl.
*A61C 13/00* (2006.01)
(52) U.S. Cl.
CPC ............................. *A61C 13/0004* (2013.01)

(58) Field of Classification Search
CPC ... A61C 13/0004; A61C 9/0053; G06F 30/10; G06F 30/20
See application file for complete search history.

(56) References Cited

U.S. PATENT DOCUMENTS

2004/0220691 A1\* 11/2004 Hofmeister ........ A61C 13/0004
                                                                                   700/98
2005/0186540 A1  8/2005 Taub et al.
(Continued)

FOREIGN PATENT DOCUMENTS

WO    WO 2008/066891 A2    6/2008

OTHER PUBLICATIONS

International Search Report (PCT/ISA/210) dated Aug. 27, 2013, by the European Patent Office as the International Searching Authority for International Application No. PCT/EP2013/059161.

*Primary Examiner* — Doon Y Chow
*Assistant Examiner* — Carina Yun
(74) *Attorney, Agent, or Firm* — Buchanan Ingersoll & Rooney P.C.

(57) ABSTRACT

A method of designing a virtual 3D model of a dental restoration for a target site of a patient's set of teeth, the method including-obtaining a digital 3D representation of the set of teeth, the digital 3D representation comprising a section corresponding to the target site; determining an insertion path for the dental restoration to the target site; and designing the virtual 3D model of the dental restoration based on the digital 3D representation of the set of teeth, where the designing includes generating an outer surface of the virtual 3D model, where the determined insertion path and the outer surface of the designed virtual 3D model provide that a dental restoration manufactured from the designed virtual 3D model can be moved along the insertion path to the target site.

20 Claims, 20 Drawing Sheets

(56) References Cited

U.S. PATENT DOCUMENTS

| | | | |
|---|---|---|---|
| 2006/0115793 A1* | 6/2006 | Kopelman | A61B 5/0002 433/215 |
| 2007/0154868 A1* | 7/2007 | Scharlack | G05B 19/4097 433/215 |
| 2008/0261165 A1 | 10/2008 | Steingart et al. | |
| 2009/0075237 A1 | 3/2009 | Garcia-Aparicio | |
| 2010/0241262 A1 | 9/2010 | Taub et al. | |
| 2011/0136080 A1 | 6/2011 | Holzner et al. | |
| 2012/0088208 A1* | 4/2012 | Schulter | A61C 8/0001 433/173 |

\* cited by examiner

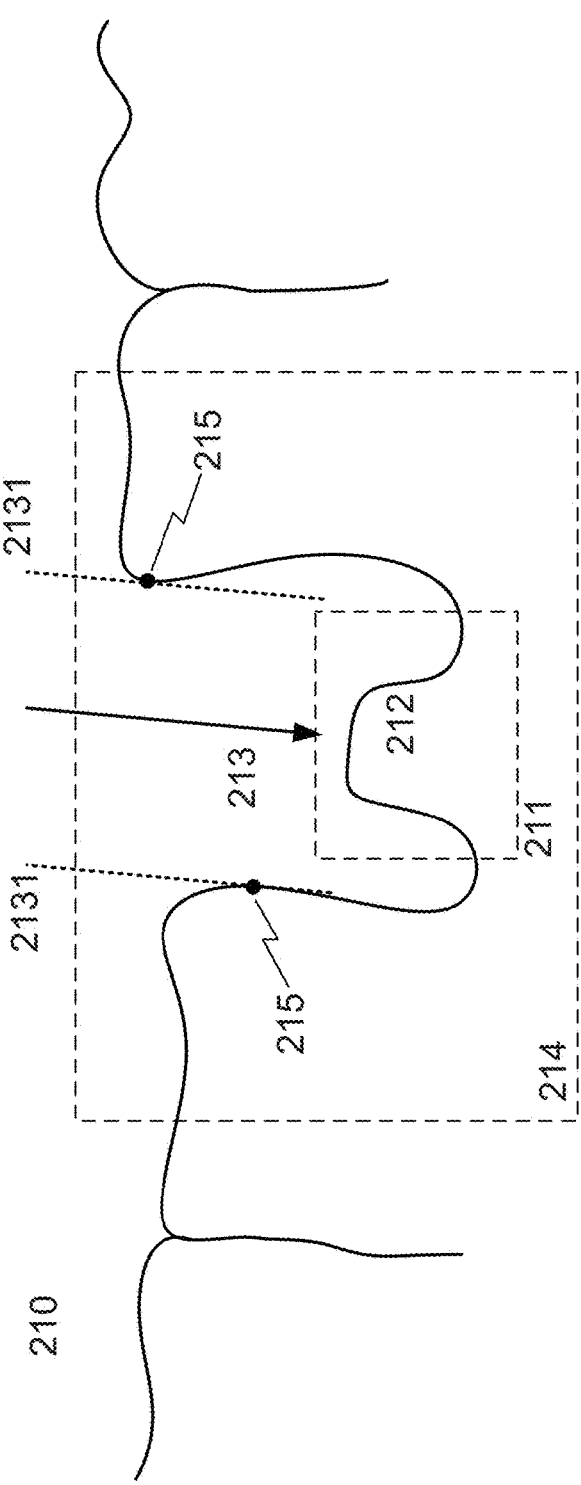
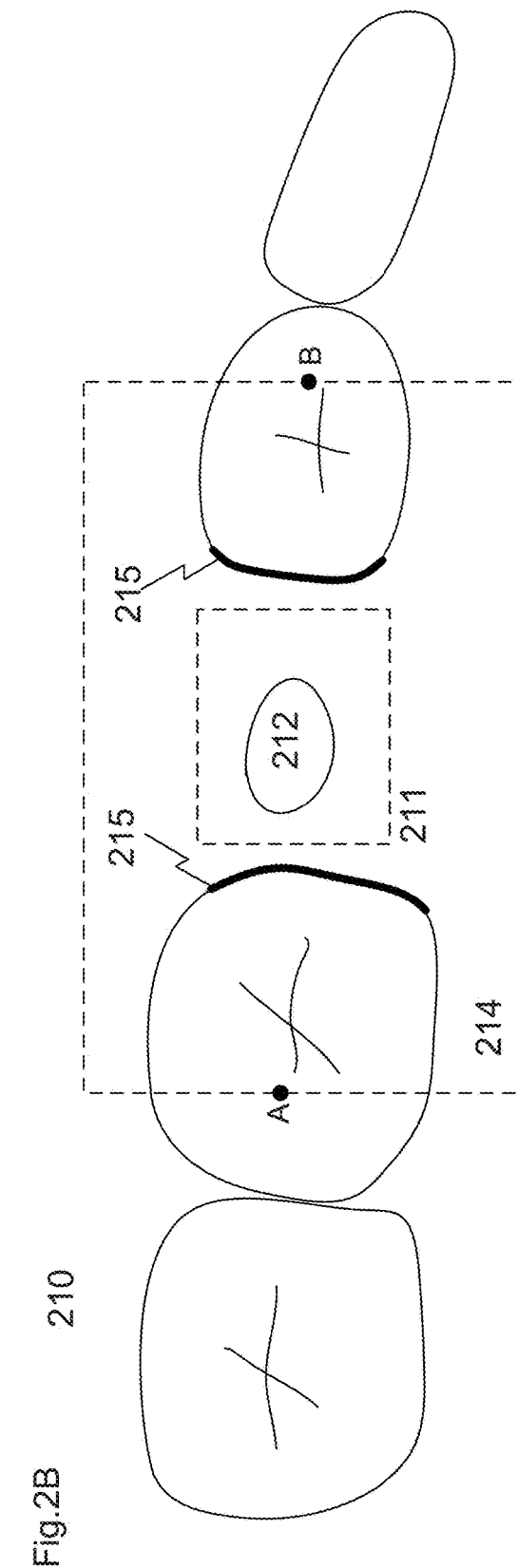
Fig.2A
Fig.2B

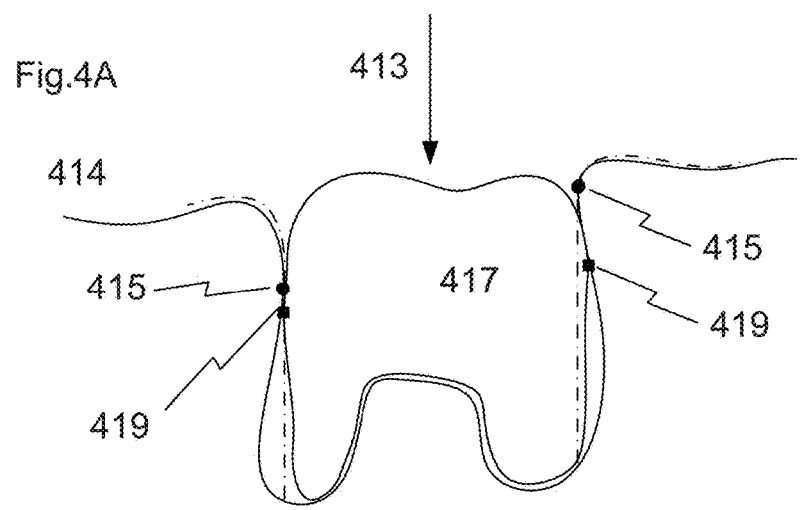
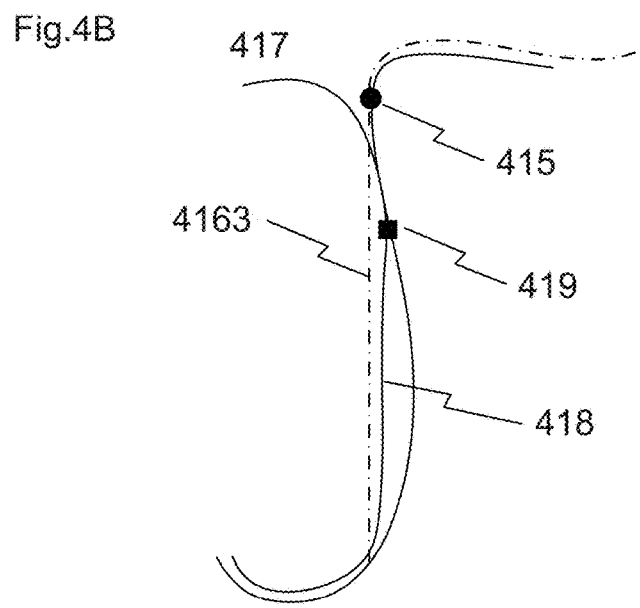
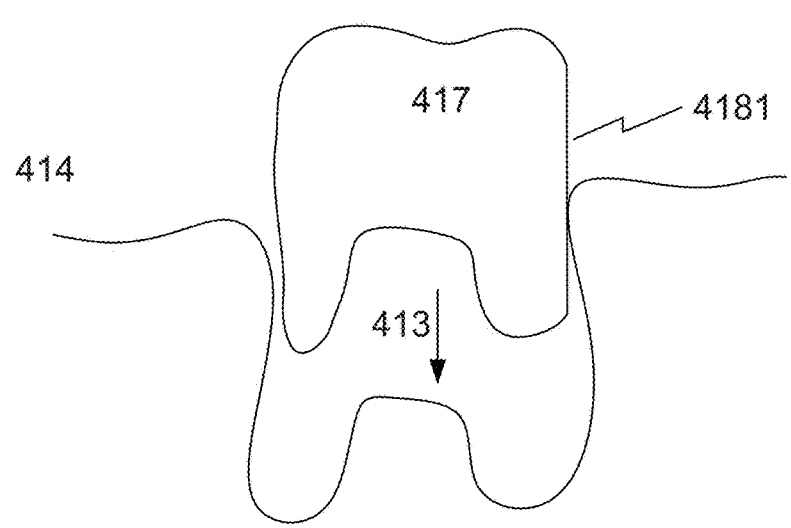

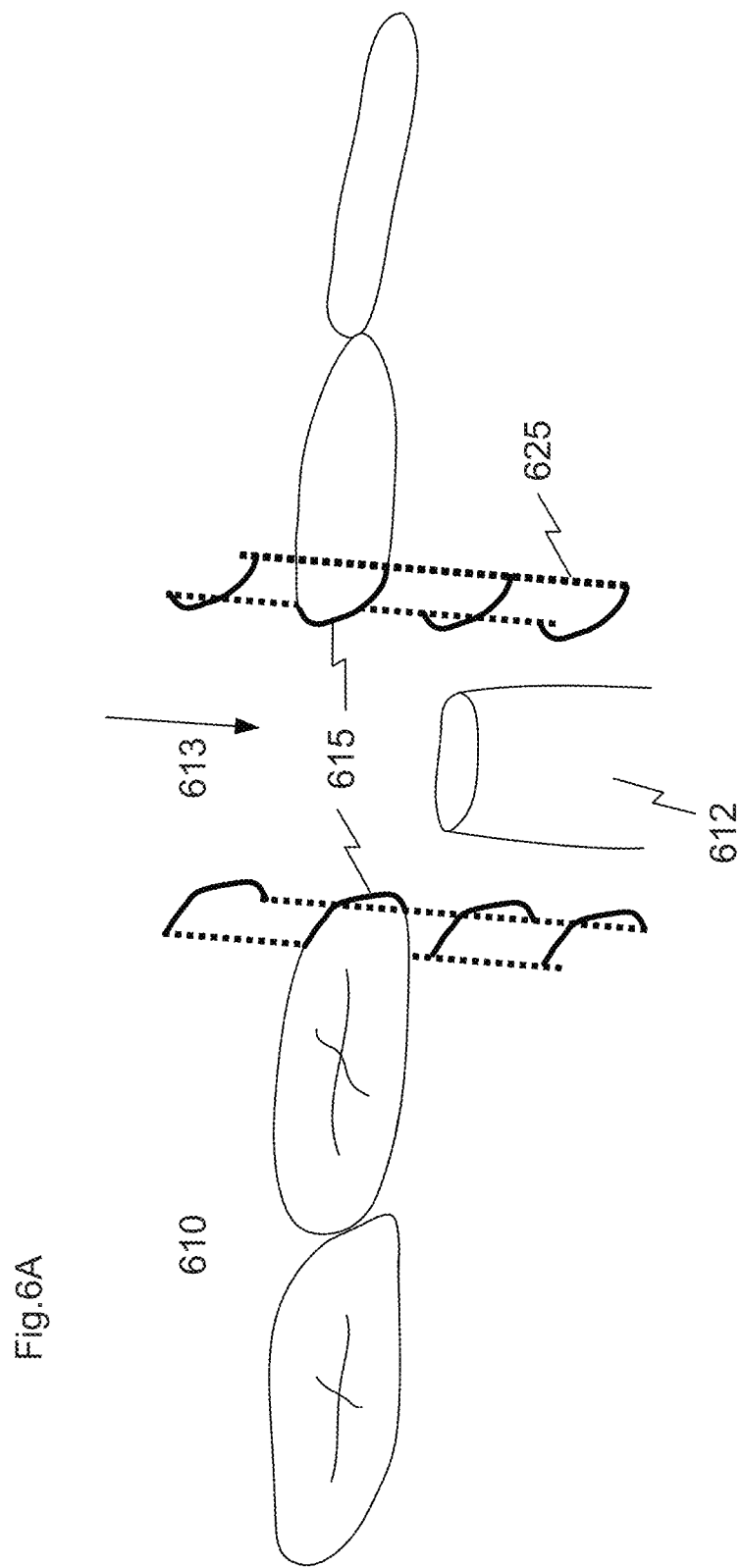

Fig.10B
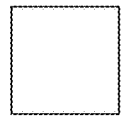
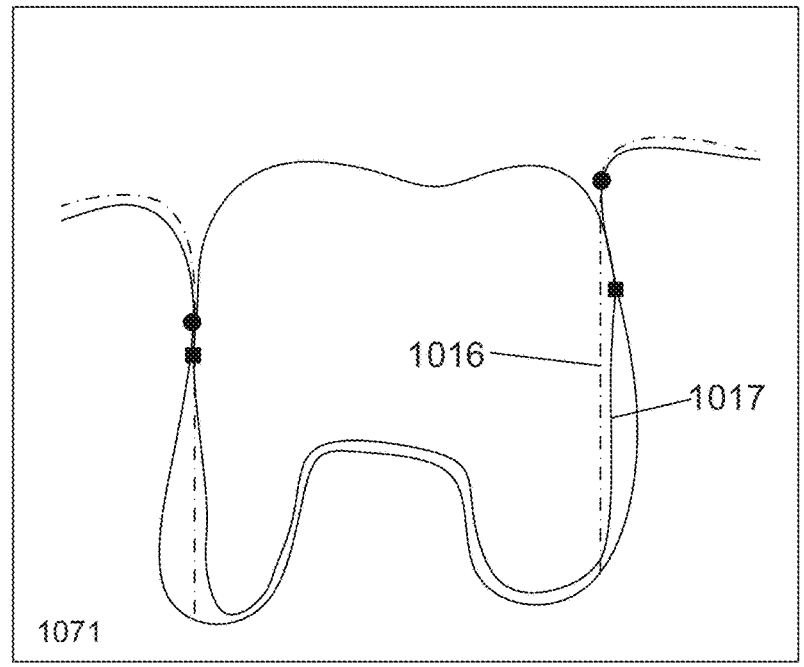
Fig.10C
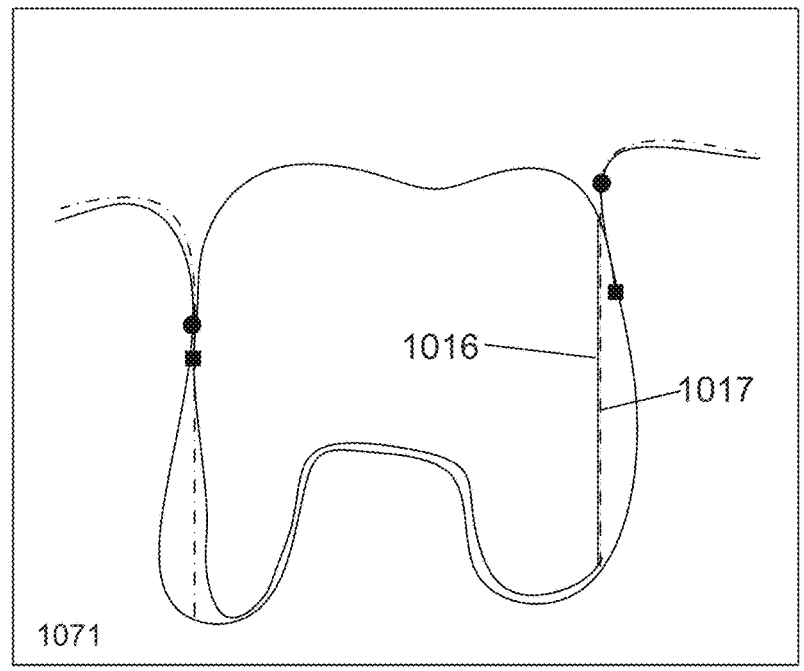

DESIGNING AN INSERTABLE DENTAL RESTORATION

FIELD OF THE INVENTION

This invention generally relates to designing a virtual 3D model of a dental restoration for a patient's set of teeth. More particularly, the invention relates to the designing of the virtual 3D model such that a dental restoration manufactured from the virtual 3D model can be inserted at a target site of the patient's set of teeth.

BACKGROUND OF THE INVENTION

US20060115793 teaches a method for providing feedback data relating to whether the geometry of a tooth prepared for accepting a dental restoration is adequate for the particular type of dental restoration.

Such an approach cannot always be used since in some cases, especially not in cases where the dental restoration is to be arranged at an implant abutment which cannot easily be modified.

In some cases, a dental restoration manufactured from a virtual 3D model of the dental restoration generated at the target site collides with the neighboring teeth when the dentist attempts to insert the manufactured dental restoration at the target site. The dentist must in some cases grind the neighboring teeth or the dental restoration in order to provide that the restoration can be arranged at the target site. This grinding process is undesirable both with respect to the utilization of chair time at the dentist and with respect to the aesthetic appearance of the set of teeth with the dental restoration. In some cases even the grinding will not allow the manufactured dental restoration to be inserted at the target site and a new restoration must be manufactured.

SUMMARY

The present invention solves this problem by taking into account the movements required for the dental restoration towards the target site when designing the virtual 3D model from which the dental restoration is manufactured.

One object of the invention is to provide a method for designing a virtual model of a dental restoration such that a dental restoration manufactured from the virtual 3D model can be inserted at a target site of the patient's set of teeth.

One object of the invention is to provide a method for designing a virtual model of a dental restoration and for determining an insertion path such that a dental restoration manufactured from the virtual 3D model can be inserted at a target site of the patient's set of teeth along the determined insertion path.

Disclosed is hence a method of designing a virtual 3D model of a dental restoration for a target site of a patient's set of teeth, said method comprising:
- obtaining a digital 3D representation of the set of teeth, said digital 3D representation comprising a section corresponding to the target site;
- determining an insertion path for the dental restoration to the target site; and
- designing the virtual 3D model of the dental restoration based on the digital 3D representation of the set of teeth, where the designing comprises generating an outer surface of the virtual 3D model;
- where the determined insertion path and the outer surface of the designed virtual 3D model provide that a dental restoration manufactured from the designed virtual 3D model can be moved along the insertion path to the target site.

In the context of the present invention, the phrase "the manufactured dental restoration" is used in relation to a dental restoration manufactured from the virtual 3D model of the dental restoration.

In the context of the present invention, the phrase "to the target site" is not limited to a movement of the dental restoration all the way to its final position at the target site. The phrase may also cover the situation where the dental restoration is moved towards the target site but not all the way to its final position.

At the target site the dental restoration is preferably arranged according to a target arrangement which is described by a target location and a target orientation relative to the target site.

In some sections of this text, the movement of the dental restoration is such that the dental restoration is moved away from the target site along the insertion path which in the patient's mouth would correspond to a removal of the dental restoration instead of inserting it. With respect to an evaluation of whether the generated outer surface of the dental restoration collides/intersects with the neighboring teeth, this change of direction is often allowable since the direction of the movement is irrelevant for this evaluation.

By modifying the insertion path and/or the virtual 3D model before manufacturing the dental restoration from the modified virtual 3D model the method provides that the manufactured dental restoration can be moved to the target site.

One object of the invention is to provide a method of designing a virtual 3D model of a dental restoration for a target site of a patient's set of teeth, said method comprising:
- obtaining a digital 3D representation of the set of teeth, said digital 3D representation comprising a section corresponding to the target site;
- determining an insertion path for the dental restoration to the target site; and
- designing the virtual 3D model of the dental restoration based on the digital 3D representation of the set of teeth, where the designing comprises generating an outer surface of the virtual 3D model;
- such that the form of the determined insertion path and the shape of said outer surface of the designed virtual 3D model provide that a dental restoration manufactured from the virtual 3D model can be moved along the insertion path to the target site of the patient's set of teeth.

One object of the invention is to provide a method of designing a virtual 3D model of a dental restoration for a patient's set of teeth such that the dental restoration when manufactured from said virtual 3D model can be moved to a target site of the set of teeth, said method comprising:
- obtaining a digital 3D representation of the set of teeth, said digital 3D representation comprising a section corresponding to the target site;
- determining an insertion path for the dental restoration to the target site; and
- designing the virtual 3D model of the dental restoration based on the digital 3D representation of the set of teeth, where the designing comprises generating an outer surface of the virtual 3D model, and where said outer surface is shaped such that the manufactured dental restoration can be moved along the insertion path to the target site.

In some embodiments, the insertion path is based on the digital 3D representation of the patient's set of teeth, such as based on the shape of the target site and/or neighbor section of digital 3D representation of the patient's set of teeth.

In some embodiments, the designing comprises modifying the generated outer surface. In some embodiments, the modification of the generated outer surface is configured to provide that the manufactured dental restoration can be moved to the target site along the insertion path. The modification of the generated outer surface provides that a dental restoration manufactured from the designed virtual 3D model can be inserted at the target site even in the case where the set of teeth has undercuts when viewed along the insertion path.

In some embodiments, the insertion path is determined in part from the neighbor section of the digital 3D representation of the patient's set of teeth.

For a given design of the virtual 3D model of the dental restoration it may be determined whether there exists an insertion path along which the manufactured dental restoration can be moved to the target site in the patient's set of teeth. This may be along a path with no collision with the neighbor teeth or along a path which requires a limited displacement of the neighbor teeth to make space for the insertion of the dental restoration.

In some embodiments, the method comprises modifying the generated insertion path to provide that a dental restoration manufactured from the designed virtual 3D model can be moved to the target site along the modified insertion path.

In some embodiments, the insertion path and the outer surface of the designed virtual 3D model are such that the manufactured dental restoration can be moved to the target site along the insertion path without any collisions with the patient's teeth surrounding the target site. For such an insertion path and outer surface, the insertion path can be said to be collision-free.

The virtual 3D model of the dental restoration can still be moved through the neighbor section of the digital 3D representation of the patient's set of teeth since the two virtual entities are capable of overlapping each other. If it is desired that the virtual entities must mimic the physical entities more precisely a rule may be applied to the virtual entities, where the rule dictates that they cannot overlap.

In some embodiments, the insertion path and the outer surface of the designed virtual 3D model are such that a limited movement of the neighboring teeth is required before the manufactured dental restoration can be moved to the target site along the insertion path. This approach may be advantageous when a limited movement of the neighboring teeth is allowed when moving the manufactured dental restoration along the insertion path.

This limited movement of the neighboring teeth may be quantified by a displacement angle and/or a displacement distance, such as a displacement distance measured in a plane substantially parallel to the occlusal plane of the teeth. The displacement distance may be in the range of 0.01 mm to 3 mm, such as in the range of 0.1 mm to 2 mm, such as in the range of 0.5 mm to 1.5 mm. The displacement angle may be in the range of 0.1 degrees to 15 degrees, such as in the range of 1 degree to 10 degrees, such as in the range of 2 degree to 8 degrees.

In some embodiments, the digital 3D representation of the set of teeth comprises a neighbor section corresponding to one or more teeth surrounding the target site. The neighbor section may comprise at least a portion of the neighbor teeth. The neighbor section may comprise teeth on one or both sides of the target site.

In some embodiments, the method comprises determining at least one circumference segment for the neighbor section relative to the insertion path. A circumference segment may be defined by the circumference of a tooth in the neighbor section when this tooth is viewed along the insertion path. The circumference segment may be a part of the entire circumference of the tooth, with the circumference segment being located adjacent to the target site such that it covers at least a portion of the tooth circumference facing the target site.

For a straight insertion path, the circumference segments of the neighbor section are located where the projections of the insertion path are tangential to the digital 3D representation.

In some embodiments, the method comprises determining at least a portion of an equator line of the virtual 3D model of the dental restoration. The equator line may be defined as the circumference of the virtual 3D model when viewed along the insertion path.

The circumference segments can be determined using computer implemented algorithms also utilized in relation to virtual block-out of undercuts.

In some embodiments, the method comprises determining a limiting volume of the digital 3D representation, said limiting volume comprising a boundary.

In some embodiments, the limiting volume is determined before the outer surface of the virtual 3D model is generated.

This provides the advantage that the outer surface immediately can be generated such that a dental restoration manufactured from the virtual 3D model having the generated outer surface can be inserted at the target site along the determined insertion path.

In some embodiments, the limiting volume is determined after the outer surface of the virtual 3D model is generated.

This may be advantageous when the virtual 3D model is designed from a library template.

In some embodiments, the method comprises determining whether the equator line is located outside the limiting volume, and if this is the case then modifying the generated outer surface of the virtual 3D model to provide that the equator line is within the limiting volume.

The limiting volume is preferably such that when the outer surface of the virtual 3D model is confined within the limiting volume, the manufactured dental restoration can be moved to the target site along the insertion path. I.e. the manufactured dental restoration can be inserted at the target site if the outer surface of the designed virtual 3D model does not extend beyond the boundaries of the limiting volume.

The limiting volume hence provides an indication of the space available for a dental restoration along the insertion path. This indication is at least in part provided at the target site, i.e. at the final position of the dental restoration such that the limitations dictated by the movement of the dental restoration are visualized at the target site. The available space is at least in part determined from the geometry of the teeth of the neighbor section.

The limiting volume may be represented by one or more boundaries which not necessarily forms a closed surface.

In some embodiments, designing the virtual 3D model of the dental restoration comprises shaping the generated outer surface such that it is confined within the limiting volume or within a predetermined offset from the limiting volume.

In some embodiments, the modifying of the generated outer surface such that it is confined within the limiting volume or within a predetermined offset from the limiting volume.

Having the outer surface of the designed virtual 3D model is advantageous since it provides that a dental restoration manufactured from the designed virtual 3D model can be moved along the insertion path to the target site.

In the context of the present invention, the outer surface is considered to be confined within the limiting volume when the outer surface is at the boundary of the limiting volume or closer to the center of the dental restoration than the boundary, i.e. when no sections of the outer surface extends outside the limiting volume.

In the context of the present invention, the outer surface is considered as being confined within a predetermined offset from the limiting volume when all parts of the outer surface are at a virtual surface defined by the predetermined offset or closer to the center of the dental restoration than this virtual surface, i.e., when no sections of the outer surface extends outside the virtual surface.

In some embodiments, the designing comprises projecting portions of the virtual 3D model which extends outside the limiting volume onto the boundary of the limiting volume such that the outer surface is confined within the limiting volume. For a vertex based virtual 3D model this may be done by pushing vertices of the generated outer surface of the virtual 3D model onto the boundary of the limiting volume or into the limiting volume. This approach often provides a smooth tooth surface at the transition between the areas which were pushed and those which were not.

In some embodiments, the designing comprises virtually cutting away portions of the generated outer surface of the virtual 3D model of the dental restoration which extends outside the limiting volume such that the outer surface is confined within the limiting volume. This may e.g. be done by a Boolean operation.

By doing so, the outer surface of the designed virtual 3D model is such that a dental restoration manufactured from the designed virtual 3D model can be inserted at the target site of the patient's set of teeth.

In some embodiments the designing comprises projecting portions of the virtual 3D model which extends further than a predetermined threshold distance away from the boundary of the limiting volume onto a virtual surface arranged at the predetermined threshold distance from the limiting surface or virtually cutting away said portions such that no parts of the virtual 3D model extends further away from the boundary of the limiting volume than the predetermined threshold distance.

By doing so, the outer surface of the designed virtual 3D model is such that a dental restoration manufactured from the designed virtual 3D model can be inserted at the target site of the patient's set of teeth.

In some embodiments, the limiting volume is determined from the circumference segment or circumference segments of the neighbor section.

With the circumference segment or segments at the surface of the teeth in the neighbor section of the digital 3D representation of the set of teeth and the outer surface of the virtual 3D model confined within the corresponding limiting volume, the virtual 3D model of the dental restoration can be virtually moved along the insertion path to the target site without any collisions between the virtual 3D model and the neighbor section. For the manufactured dental restoration this means that it can be inserted at a prepared tooth or implant abutment at the target site in the patient's set of teeth.

When there is no overlap or virtual collisions between the designed virtual 3D model of the dental restoration and the neighbor section there may still be contact between the manufactured dental restoration and the neighbor teeth at one or more positions along the insertion path. However such contact does not prevent the insertion of the manufactured dental restoration.

In some embodiments, the limiting volume is determined from a line defined by an offset of the circumference segment or segments of the neighbor section. In such embodiments, it may still be advantageous to visualize a limiting volume (or the boundary of this limiting volume) determined directly from the circumference segment while using the limiting volume determined from the offset line in modifying the generated outer surface of the virtual 3D model of the dental restoration. This can e.g. be realized on a visual display unit, such as a computer screen being part of a system configured for implementing the method according to the present invention, on which unit the virtual 3D model, the digital 3D representation of the patient's set of teeth, and the limiting volume determined from the circumference segment are visualized to an operator. In such visualization the virtual 3D model may extend outside the visualized limiting volume since the virtual 3D model is not designed based on the visualized limiting volume but instead based on the limiting volume determined from the offset line.

The offset may be into the tooth or teeth of the neighbor section relative to the circumference segment. With such an offset, the limiting volume extends into the neighbor tooth. Such an offset may be used when a limited displacement of the neighbor tooth during the insertion or a slight removal of material from the neighbor tooth is accepted.

The offset may be away from the tooth or teeth of the neighbor section relative to the circumference segment. Such an offset provides that there is more space for the insertion of the dental restoration.

In some embodiments, the limiting volume is defined from the circumference segment on both neighbor teeth. The offset may be into one neighbor tooth and away from the other neighbor tooth.

In some embodiments, the limiting volume is defined from the circumference segment on one neighbor tooth and from the offset line on the other neighbor tooth.

In some embodiments, the limiting volume is defined from offset lines on both neighbor teeth.

In some embodiments, part of the boundary comprises a first portion at the target site.

In some embodiments, part of the boundary of the limiting volume comprises a first portion and a second portion, where the first and second portions are separated by the circumference segment or the offset line, and where the first portion is at the target site. In the context of the present invention, the phrase "separated by the circumference segment" can also be used in relation to the case where the limiting volume is defined from an offset line, where the phrase describes that the first and second portions are separated by the offset line.

In some embodiments, the first and/or the second portion of the boundary are formed by extending the circumference segment of the neighbor section or the line defined by the offset of the circumference segment, i.e. the offset line, along the insertion path such that the formed surface defines the boundary.

In some embodiments, the first portion of the boundary may be formed by extending the circumference segment or the offset line towards the target site.

This approach has the advantage that when the designed virtual 3D model of the dental restoration is confined within this limiting volume, the manufactured dental restoration can be moved along the insertion path to the target site.

In some embodiments, the second portion of the boundary may be formed by extending the circumference segment or the offset line away from the target site, i.e. in the opposite direction of the insertion path.

In some embodiments, part of the second portion of the boundary is configured to follow the surface of the teeth in the neighbor section, such as to follow the occlusal surface of the teeth in the neighbor section.

This approach has the advantage that the limiting volume at the occlusal surface of the teeth correctly represents the physical situation since movements of the manufactured dental restoration above the occlusal plane is not limited by the neighbor section of the teeth.

In some embodiments, the first portion of the boundary is determined from a virtual surface generated by a virtual block-out of the neighbor section. A virtual block-out generates a surface which is configured to remove undercut volumes in the neighbor section. The surface generated by the virtual block-out is preferably parallel with the insertion path. When the virtual 3D model of the dental restoration does not extend beyond the virtual surface defined by the virtual block-out, the manufactured dental restoration can be inserted at the target site.

In some embodiments, the insertion path is shaped such that the outer surface of the virtual 3D model is confined within the limiting volume. This may be realized by a process wherein the insertion path is modified and a modified limiting volume is determined from the modified insertion path. It is then determined whether the virtual 3D model extends outside the limiting volume. This process may be repeated until the virtual 3D model is confined within the limiting volume. This approach may provide the advantage that an insertion path is found which allows the designed virtual 3D model to have the generated outer surface or which allows the outer surface of the designed virtual 3D model to have an outer surface which is very close to the generated outer surface.

In some embodiments, the method comprises detecting virtual collisions between the generated outer surface of the virtual 3D model and the digital 3D representation of the set of teeth when moving the virtual 3D model to or from the target site along the insertion path.

In some embodiments, the method comprises detecting virtual collisions between the virtual 3D model of the dental restoration and the limiting volume when moving the virtual 3D model to or from the target site along the insertion path.

In some embodiments, designing the virtual 3D model comprises modifying the generated outer surface such that the detected virtual collisions are avoided or their extent is lowered to a predetermined threshold value.

The circumference segment or the line defined from an offset of the circumference line can also be used for the detection of virtual collisions. The surface inside the virtual 3D model defined by the trace of the circumference segment or the offset line during the virtual movement of the virtual 3D model then describes the virtual collisions.

In some embodiments, the designing comprises evaluating whether a dental restoration manufactured from a present form of said virtual 3D model can be moved along said insertion path to the target site.

In some embodiments, the designing comprises evaluating the generated outer surface. In some embodiments, the evaluating of the generated outer surface comprises determining whether it is such that the manufactured dental restoration can be moved along said insertion path to the target site.

For the virtual 3D model of the dental restoration this is equivalent to the situation where the virtual 3D model can be moved along the insertion path without any or with a limited/specified amount of collision with the neighbor section of the digital 3D representation of the patient's set of teeth.

One advantage of evaluating whether the virtual 3D model of the dental restoration or the manufactured dental restoration can be moved to the target site is that the evaluation can make it clear to an operator or to an automated implementation of the invention that the generated outer surface of the virtual 3D model needs to be modified.

In some embodiments, the designing comprises evaluating the generated outer surface by determining whether the generated outer surface is such that the manufactured dental restoration can be moved along said insertion path to the target site and if this is not the case then modifying the generated outer surface to provide that the manufactured dental restoration can be moved to the target site along the insertion path.

In some embodiments, designing the virtual 3D model of the dental restoration comprises evaluating whether the generated outer surface is such that the virtual 3D model can be virtually moved to the target site along the insertion path without having an overlap with the neighbor section, such as an overlap which exceeds a threshold value at any position along the insertion path. An overlap corresponds to a collision between the manufactured dental restoration and the neighbor teeth of the patient's set of teeth where the collision may result in a slight temporary displacement of the neighbor teeth when inserting the dental restoration.

In some embodiments, the threshold value relates to a maximum penetration depth, a maximum volume of the overlap, or a maximum displacement angle of teeth in the neighbor section.

The maximum penetration depth may be below 3 mm, such as below 2 mm, such as below 1 mm, such as below 0.5 mm.

The maximum volume of the overlap may be below 300 $mm^3$, such as below 200 $mm^3$, such as below 150 $mm^3$, such as below 125 $mm^3$, such as below 100 $mm^3$, such as below 75 $mm^3$, such as below 50 $mm^3$, such as below 25 $mm^3$, such as below 10 $mm^3$.

The maximum displacement angle may be below 20 degrees, such as below 15 degrees, such as below 10 degrees, such as below 5 degrees.

In some embodiments, the designing comprises shaping the generated outer surface of the virtual 3D model of the dental restoration such that the overlap with the neighbor section is below the threshold value. This can be done by projecting the generated outer surface onto a virtual surface defined from the threshold value, or virtually cutting away the part of the virtual 3D model which extends further outside the boundary of the limiting volume than the threshold value, or by sculpting the virtual 3D model using a virtual sculpting tool.

In some embodiments, the generated outer surface of the virtual 3D model is modified by generating a virtual surface representing the shape of the outer surface at which the overlap is within the threshold value and shaping the outer surface according to this virtual surface. This may e.g. for a vertex based outer surface be done by pushing the relevant vertices of the surface of the virtual 3D model onto the virtual surface.

In some embodiments, the evaluation comprises determining the overlap between the circumference segment of the neighbor section and a circumference of the virtual 3D model of the dental restoration.

In some embodiments, the virtual 3D model of the dental restoration is modified using a virtual sculpting tool. The sculpting may be performed on portions of the virtual 3D model which extends outside the limiting volume. In some embodiments, the sculpting is configured to push the parts of the generated outer surface of the virtual 3D model onto a virtual surface defined by a limiting volume determined from the circumference segment and a user determined distance from the boundary of this limiting surface.

In some embodiments, the method is an iterative process wherein the outer surface of the virtual 3D model and/or the insertion path are modified one or more times.

In some embodiments, the designing comprises an iterative process wherein the virtual 3D model of the dental restoration and/or the insertion path are modified one or more times.

An iterative approach may provide the advantage that the generated outer surface can be modified in a number of iterations which in some cases allows for a better final result of the designed virtual 3D model of the dental restoration.

In some embodiments at least one of the following is performed in real time:
evaluating the generated surface,
evaluating whether the generated outer surface is such that the virtual 3D model can be virtually moved to the target site along the insertion path without having an overlap with the neighbor section which exceeds a threshold value at any position along the insertion path,
detecting the virtual collisions,
determining the limiting volume,
determining whether the generated outer surface is confined the within the limiting volume, and
determining whether said virtual collisions are avoided when modifying the virtual 3D model,
such as performed simultaneous with modification of the insertion path and/or of the outer surface of virtual 3D model of the dental restoration, such as for each modification in the iterative process.

The evaluating of the generated surface may determine whether a dental restoration manufactured from the virtual 3D model having the generated outer surface can be moved along said insertion path to the target site.

The evaluating of the generated surface may determine whether a dental restoration manufactured from the virtual 3D model having a modified outer surface can be moved along said insertion path to the target site, In some embodiments, determining the insertion path comprises providing an initial insertion path. The initial insertion path may be provided manually using a pointing tool, such as a computer mouse, or automatically from the shape of target site, e.g. from the shape of a prepared tooth or implant abutment in the target site.

The initial insertion direction may be chosen such that undercuts on the prepared tooth or the implant analog are avoided.

In some embodiments, determining the insertion path comprises modifying the provided initial insertion path preferably such that the dental restoration can be moved along the modified insertion path to the target site with or without a modification of the generated outer surface of the virtual 3D model of the dental restoration.

In some embodiments, an initial limiting volume of the digital 3D representation at the target site is determined based on said initial insertion path and the available space for the dental restoration. The available space can be determined from the digital 3D representation of the patient's set of teeth, such as the target site and the neighbor section of the digital 3D representation.

In some embodiments, the outer surface of the virtual 3D model of the dental restoration is generated by obtaining an initial version of the virtual 3D model and the designing comprises modifying the outer surface of the initial virtual 3D model.

In some embodiments, designing the virtual 3D model of the dental restoration comprises obtaining an initial version of the virtual 3D model of the dental restoration and modifying the outer surface of the initial virtual 3D model.

The initial version of the virtual 3D model may be such that a dental restoration manufactured from the initial version fits at the target site. However in some cases it will not be possible to insert such a tooth at the target site due to collisions with the neighbor teeth along the insertion path.

The virtual 3D model may be modified based on the overlap/threshold value or based on the limiting volume.

This provides the advantage that it will be possible to insert a dental restoration manufactured from the modified virtual 3D model at the target site.

An insertion path for the dental restoration preferably describes a path along which the dental restoration can be moved to the target site. In some cases there exists no insertion path which allows a dental restoration manufactured from a virtual 3D model having the generated outer surface, and the generated outer surface must be modified such that a dental restoration manufactured from the designed virtual 3D model can be inserted at the target site.

In some embodiments, the insertion path is such that the dental restoration is moved all the way to the target site. I.e. when the dental restoration follows the insertion path it is moved all the way to the target arrangement where it contacts e.g. a prepared tooth or an implant abutment.

In the designing of the virtual 3D model of the dental restoration an initial guess for an insertion path may be used, where the virtual 3D model of the dental restoration virtually collides with the neighbor section of the digital 3D representation of the patient's set of teeth. In such cases, it may not be possible to insert a dental restoration manufactured from the virtual 3D model along the insertion path. The initial guess for the insertion path may however still be used in the designing e.g. in the embodiments where the virtual 3D model of the dental restoration is modified to ensure that the manufactured dental restoration can be moved to the target site along an insertion path according to the initial guess or along a modified insertion path.

In the designing of the virtual 3D model, the insertion path may be represented digitally, i.e. the insertion path is a virtual insertion path which e.g. can be visualized in relation to the digital 3D representation of the patient's set of teeth.

In some embodiments, the insertion direction is derived from said digital 3D representation of the set of teeth, such as from the shape and arrangement of a prepared tooth or an implant abutment relative to the teeth of the neighbor section in the digital 3D representation of the set of teeth.

The shape and relative arrangement of the prepared tooth or the implant abutment in the digital 3D representation of the set of teeth may determine an insertion direction for the dental restoration at the target site, such as at the position where the dental restoration engages the prepared tooth or implant abutment.

In some embodiments, the insertion path comprises a first section at the target site and a second section corresponding to a position at some distance from the target site, such as at the occlusal plane of the teeth or further away from the target site. The first section may be based on the insertion direction, such that the first section is aligned with the insertion direction.

In some embodiments, the insertion path is determined based on an insertion direction of the dental restoration at the target site, i.e. the insertion path comprises a portion of the insertion path where the dental restoration engages the prepared tooth or implant abutment at the target site. The first section of insertion path may then be dictated by the geometrical shape and relative arrangement of the prepared tooth or the implant analog.

In some embodiments, the insertion direction is a straight line. When a first section of the insertion path is based on the insertion direction, the first section of the insertion path may be according to this straight line.

In some embodiments, the insertion path is linear at least at the target site. The insertion path may be linear over a length corresponding to the distance from the target site to the occlusal plane of the teeth.

The insertion path may be linear over a length of more than 2 mm from the target site, such as over a length of more than 4 mm from the target site, such as over a length of more than 6 mm from the target site, such as over a length of more than 8 mm from the target site, such as over a length of more than 12 mm from the target site.

The distance from the target site or said length may be measured from the position where the dental restoration is arranged such that it engages a prepared tooth or an implant analog at the target site.

In some embodiments, the insertion path is non-linear, such as a path having one or more bends or curved sections. Some sections of the non-linear insertion path may be linear, such as the first section at the target site. The insertion path may be such that a projection of it into one longitudinal plane is a straight line while in a perpendicular longitudinal plane the projection resembles a concave or convex curve for a least a section of the insertion path. The longitudinal planes extend along an axis which is defined by the longitudinal axis of at least one of the neighbor teeth.

In some embodiments, the insertion path is determined based on a single insertion direction of the dental restoration at the target site.

In some embodiments, a coherent range of insertion paths is determined where the dental preparation can be moved to the target site along any insertion path in said coherent range.

In some embodiments, the insertion path is determined and/or modified using a computer implemented insertion path algorithm. The algorithm may be configured to provide a specific tolerance, i.e. to ensure that there is a coherent range of insertion paths. The specific tolerance may be with respect to an angular tolerance such that the dental restoration can be moved along a number of insertion paths which differs slightly in angle relative to e.g. the normal to the occlusal plane. The specific tolerance may be with respect to an offset along an axis parallel to the occlusal plane.

In some embodiments, the method comprises determining an ideal insertion path for a dental restoration based on the modified outer surface of the virtual 3D model. The ideal insertion path may be determined after the virtual 3D model has been modified to provide that the dental restoration can be moved to the target site.

In some embodiments, the method comprises determining a number of insertion paths, such as a number of potential paths along which the dental restoration can be moved to the target site with no or with little modification of the outer surface of the virtual 3D model of the dental restoration.

In some embodiments, the method comprises visualizing one or more insertion paths along which the manufactured dental restoration can be moved to the target site. The insertion path may be visualized in relation to the digital 3D representation of the patient's set of teeth.

In some embodiments, the method comprises visualizing one or more of:
  the overlap between the virtual 3D model and the neighbor section;
  the limiting volume and/or the boundary of the limiting volume;
  the insertion path;
  the portion of the virtual 3D model extending outside said limiting volume; and
  the virtual collisions.

In some embodiments, the limiting volume and/or the boundary of the limiting volume is visualized as a semi-transparent structure together with the digital 3D representation of the patient's set of teeth.

In some embodiments, the visualization utilizes a color coding, such as a coding where a color map displayed on the outer surface of the virtual 3D model uses different colors to indicate different depths of the virtual collisions. The color map may also be displayed on the teeth of the neighbor section.

In some embodiments, the method comprises visualizing in real time changes in the overlap between the virtual 3D model and the neighbor section, in the limiting volume, in the portion of the virtual 3D model extending outside said limiting volume, and in the virtual collisions caused by the modification of the outer surface and/or of the insertion direction.

In the context of the present invention, the phrase "in real-time" may refer to the case where the changes are visualized as the virtual 3D model is modified, i.e. that the changes are visualized for each modification of the virtual 3D model of the dental restoration or of the insertion path.

In some embodiments, the virtual 3D model is for manufacturing a dental restoration for a single crown, for a bridge restoration or for a partial denture.

In some embodiments, the target site comprises is a prepared tooth prepared for accepting the dental restoration or an abutment secured at a dental implant located in the patient's jaw bone.

In some embodiments, the digital 3D representation of the patient's set of teeth is obtained by intra-oral scanning or by scanning physical model or an impression of the patient's set of teeth using a desktop scanner. The scanning may be performed by means of laser light scanning, white light scanning, probe-scanning, X-ray scanning, and/or CT scanning.

In some embodiments one or more steps in the method are computer-implemented.

In some embodiments the virtual 3D model of the dental restoration is obtained from a template library.

Disclosed is a system for designing a virtual 3D model of a dental restoration for a patient's set of teeth such that the dental restoration when manufactured from the designed virtual 3D model can be moved to a target site of the set of teeth, wherein the system comprises a non-transitory computer readable medium having one or more computer instructions stored thereon, where said computer instructions comprises instructions for designing said virtual 3D model by the method according to any of the embodiments.

Disclosed is a method of manufacturing a dental restoration, wherein the method comprises:

designing a virtual 3D model of the dental restoration using the method according to any of the embodiments; and manufacturing the dental restoration from the designing virtual 3D model by direct digital manufacturing.

Disclosed is a non-transitory computer readable medium storing thereon a computer program, where said computer program is configured for causing computer-assisted designing a virtual 3D model of a dental restoration for a patient's set of teeth such that the dental restoration when manufactured from the designed virtual 3D model can be moved to a target site of the set of teeth, wherein the virtual 3D model is designed using the method according to any of the embodiments.

Furthermore, the invention relates to a computer program product comprising program code means for causing a data processing system to perform the method according to any of the embodiments, when said program code means are executed on the data processing system, and a computer program product, comprising a computer-readable medium having stored there on the program code means.

Disclosed is a virtual environment for designing a dental restoration comprising a virtual work space adapted for providing a virtual 3D model of a dental restoration, wherein the virtual environment further comprises a virtual modification tool for reshaping the virtual 3D model to be confined within a limiting volume when activated.

In some embodiments, the virtual modification tool is provided as a virtual button.

Disclosed is a method of designing a virtual 3D model of a dental restoration for a patient's set of teeth such that a collision-free insertion path or a nearly collision-free insertion path exist along which the dental restoration can be moved towards a target site of the set of teeth, said method comprising:
  obtaining a digital 3D representation of the set of teeth, said digital 3D representation comprising a section corresponding to the target site;
  determining an insertion path for the dental restoration to the target site;
  determining a limiting volume of the digital 3D representation, where the limiting volume provides an indication of the space available for a dental restoration when moving it along the insertion path; and
  designing the virtual 3D model of the dental restoration such that it is confined within the limiting volume.

The collision-free insertion path is such that no virtual collisions occur between the virtual 3D model of the dental restoration and the digital 3D representation the set of teeth when moving the virtual 3D model to the target site along a selected insertion path.

For a nearly collision-free insertion path, a limited displacement of the neighbor teeth is required in order to insert the dental restoration at the target site.

The space available for the dental restoration depends on the shape of the neighbor section to of the patient's set of teeth and the shape of the insertion path.

Disclosed is a method of designing a virtual 3D model of a dental restoration for a patient's set of teeth, where the virtual 3D model is designed to provide that a collision-free insertion path or a nearly collision-free insertion path exist along which the dental restoration can be moved towards a target site of the set of teeth, said method comprising:
  obtaining a digital 3D representation of the set of teeth, said digital 3D representation comprising a section corresponding to the target site;
  designing the virtual 3D model of the dental restoration based on the digital 3D representation of the set of teeth, where the designing comprises generating an outer surface of the virtual 3D model;
  determining an initial insertion path based on an insertion direction for the dental restoration;
  evaluating whether the generated outer surface is shaped such that the virtual 3D model of the dental restoration can be virtually moved towards the target site along the initial insertion path without virtually colliding with the neighbor section of the digital 3D representation of the set of teeth corresponding to the neighboring teeth; and
  determining based on a result of said evaluation whether the generated outer surface of the virtual 3D model has to be modified, and optionally whether the insertion path has to be modified to provide that the collision-free insertion path or the nearly collision-free insertion path exist.

Disclosed is a method of designing a virtual 3D model of a dental restoration for a patient's set of teeth such that a collision-free insertion path exist for the dental restoration towards a target site of the set of teeth, said method comprising:
  obtaining a digital 3D representation of the set of teeth, said digital 3D representation comprising a section corresponding to the target site;
  determining an initial insertion path based on the insertion direction for the dental restoration at the target site;
  obtaining an initial version of the virtual 3D model of the dental restoration, said virtual 3D model comprising an outer surface of the dental restoration;
  detecting collisions between the initial version of the virtual 3D model and the digital 3D representation the set of teeth when moving the dental restoration towards the target site along the initial insertion path; and
  modifying the generated outer surface of the initial version of the virtual 3D model such that the collisions are avoided when the modified version of the virtual 3D model is moved towards the target site along the initial insertion path.

The initial version of the virtual 3D model is preferably such that a dental restoration manufactured from the initial version fits at the target site.

Disclosed is a computer implemented method for designing a virtual 3D model of a dental restoration for a patient's set of teeth, comprising:
  providing to a computer device a digital 3D representation of the patient's set of teeth said digital 3D representation comprising a section corresponding to the target site, storing said digital 3D representation in a computer readable medium, and providing said digital 3D representation to a processor;
  using said processor to determine an insertion path for the dental restoration to the target site; and
  using said processor to design the virtual 3D model of the dental restoration based on the digital 3D representation of the set of teeth where the designing comprises generating an outer surface of the virtual 3D model;
  where the determined insertion path and the outer surface of the designed virtual 3D model provide that a dental restoration manufactured from the designed virtual 3D model can be moved along the insertion path to the target site.

Disclosed is a user interface for designing a virtual 3D model of a dental restoration for a target site of a patient's set of teeth, where the user interface is configured for:

visualizing at least part of an obtained digital 3D representation of the set of teeth, said digital 3D representation comprising a section corresponding to the target site;

designing the virtual 3D model of the dental restoration based on the digital 3D representation of the set of teeth and a determined insertion path for the dental restoration to the target site, where the designing comprises generating an outer surface of the virtual 3D model and modifying said generated outer surface to provide that a dental restoration manufactured from the virtual 3D model can be moved along the insertion path to the target site of the patient's set of teeth.

Disclosed is a user interface for designing a virtual 3D model of a dental restoration for a target site of a patient's set of teeth, where the user interface is configured for:

obtaining a digital 3D representation of the set of teeth, said digital 3D representation comprising a section corresponding to the target site;

determining an insertion path for the dental restoration to the target site; and designing the virtual 3D model of the dental restoration based on the digital 3D representation of the set of teeth, where the designing comprises generating an outer surface of the virtual 3D model;

where the determined insertion path and the outer surface of the designed virtual 3D model provide that a dental restoration manufactured from the designed virtual 3D model can be moved along the insertion path to the target site.

In some embodiments, user interface is configured for visualizing the obtained digital 3D representation of the set of teeth, the determined insertion path and/or the virtual 3D model of the dental restoration to an operator using e.g. a computer screen of or connected to the user interface.

The visualization can be performed sequentially such that at least one of the visualized items is visualized before at least one of the other visualized items.

A number of the visualized items can also be visualized simultaneously, such as in cases where the generated outer surface of the virtual 3D model is visualized together with the obtained digital 3D representation of the teeth and the determined insertion path.

Both the generated and the modified outer surface of the virtual 3D model may be visualized to the operator. For example, in some embodiments the generated outer surface is visualized together with the digital 3D representation and a boundary of a limiting volume determined from the digital 3D representation. When modifying the virtual 3D model based on the limiting volume the modified outer surface of the virtual 3D model is visualized instead of the generated virtual 3D model.

In some embodiments, the user interface is configured for being visualized to an operator using a computer screen and for allowing the operator to enter data into and make choices presented in the user interface by means of a computer keyboard or a computer mouse.

In some embodiments, the user interface is configured for visualizing a limiting volume together with the digital 3D representation of the set of teeth and/or together with the virtual 3D model, and the user interface comprises a virtual modification tool for reshaping the generated outer surface of the virtual 3D model to be confined within said limiting volume when activated. If a slight movement of the neighbor teeth is allowed when the dental restoration is inserted, the virtual modification tool may instead be configured for confining the outer surface within a predetermined threshold distance from the boundary of the limiting volume when activated.

The user interface can be implemented using a computer system where the user interface is visualized using a computer screen showing the different components of the user interface, such a data entry fields and virtual push buttons configured for performing one or more steps of a method according to an embodiment of the invention. Data entry means such as a computer mouse and a computer keyboard can be connected to the computer system and used for entering data into the user interface and for making selections by e.g. pressing said virtual push buttons using the computer mouse.

In some embodiments, the user interface is configured for allowing an operator to carry out a method according to an embodiment of the invention. Preferably, at least one of the steps of obtaining a digital 3D representation of the set of teeth, determining the insertion direction and designing the virtual 3D model of the dental restoration can be performed by the operator using said user interface. In some embodiments, the steps of the method are performed sequentially and the user interface can be configured for sequentially providing a visually representation of the steps to the operator such that the sequence of the user interface matches that of the method. In some embodiments, the user interface is configured for simultaneously providing a visually representation of two or more of the steps to the operator.

3D modeling is the process of developing a mathematical, wireframe representation of any three-dimensional object, called a virtual 3D model, via specialized software. The virtual 3D model represents a 3D object using a collection of points in 3D space, connected by various geometric entities such as triangles, lines, curved surfaces, etc.

Virtual 3D models may be created automatically using multiple approaches: use of NURBS curves to generate accurate and smooth surface patches, polygonal mesh modeling which is a manipulation of faceted geometry, or polygonal mesh subdivision which is advanced tessellation of polygons resulting in smooth surfaces similar to NURBS models.

The purpose of a 3D scanner is usually to create a point cloud of geometric samples on the surface of the object. 3D scanners collect distance information about surfaces within its field of view. The "picture" produced by a 3D scanner describes the distance to a surface at each point in the picture. For most situations, a single a scan or sub-scan will not produce a complete model of the object. Multiple sub-scans, such as 5, 10, 12, 15, 20, 30, 40, 50, 60, 70, 80, 90 or in some cases even hundreds, from many different directions may be required to obtain information about all sides of the object. These sub-scans are brought in a common reference system, a process that may be called alignment or registration, and then merged to create a complete model.

Iterative Closest Point (ICP) is an algorithm employed to minimize the difference between two clouds of points. ICP can be used to reconstruct 2D or 3D surfaces from different scans or sub-scans. The algorithm is conceptually simple and is commonly used in real-time. It iteratively revises the transformation, i.e. translation and rotation, needed to minimize the distance between the points of two raw scans or sub-scans. The inputs are: points from two raw scans or sub-scans, initial estimation of the transformation, criteria for stopping the iteration. The output is: refined transformation. Essentially the algorithm steps are:

1. Associate points by the nearest neighbor criteria.

2. Estimate transformation parameters using a mean square cost function.
3. Transform the points using the estimated parameters.
4. Iterate, i.e. re-associate the points and so on.

A triangulation 3D laser scanner uses laser light to probe the environment or object. A triangulation laser shines a laser on the object and exploits a camera to look for the location of the laser dot. Depending on how far away the laser strikes a surface, the laser dot appears at different places in the camera's field of view. This technique is called triangulation because the laser dot, the camera and the laser emitter form a triangle. A laser stripe, instead of a single laser dot, may be used and is then swept across the object to speed up the acquisition process.

Structured-light 3D scanners project a pattern of light on the object and look at the deformation of the pattern on the object. The pattern may be one dimensional or two dimensional. An example of a one dimensional pattern is a line. The line is projected onto the object using e.g. an LCD projector or a sweeping laser. A camera, offset slightly from the pattern projector, looks at the shape of the line and uses a technique similar to triangulation to calculate the distance of every point on the line. In the case of a single-line pattern, the line is swept across the field of view to gather distance information one strip at a time. An example of a two-dimensional pattern is a grid or a line stripe pattern. A camera is used to look at the deformation of the pattern, and an algorithm is used to calculate the distance at each point in the pattern. Algorithms for multi-stripe laser triangulation may be used.

An intra-oral scanner may be configured for utilizing focus scanning, where the digital 3D representation of the scanned teeth is reconstructed from in-focus images acquired at different focus depths. The focus scanning technique can be performed by generating a probe light and transmitting this probe light towards the set of teeth such that at least a part of the set of teeth is illuminated. Light returning from the set of teeth is transmitted towards a camera and imaged onto an image sensor in the camera by means of an optical system, where the image sensor/camera comprises an array of sensor elements. The position of the focus plane on/relative to the set of teeth is varied by means of focusing optics while images are obtained from/by means of said array of sensor elements. Based on the images, the in-focus position(s) of each of a plurality of the sensor elements or each of a plurality of groups of the sensor elements may be determined for a sequence of focus plane positions.

The in-focus position can e.g. be calculated by determining the light oscillation amplitude for each of a plurality of the sensor elements or each of a plurality of groups of the sensor elements for a range of focus planes. From the in-focus positions, the digital 3D representation of the set of teeth can be derived.

The present invention relates to different aspects including the method and system described above and in the following, and corresponding methods, and systems each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein:

FIGS. 2A and 2B show a schematic presentation of the digital 3D representation of the patient's set of teeth with a circumference segment indicated on the neighbor section.

FIGS. 4A-4C show how the invention can be applied to a situation where the equator line of the dental restoration is located below the corresponding circumference segment of the neighbor section, with FIG. 4C showing how a manufactured dental restoration can be moved along an insertion path to be inserted at a prepared tooth.

FIGS. 6A and 6B show how part of the boundaries of the limiting volume can be determined.

FIGS. 10A-10C show schematics of a user interface according to an embodiment of the invention

DETAILED DESCRIPTION

In the following description, reference is made to the accompanying figures, which show by way of illustration how the invention may be practiced.

Figure 1A:
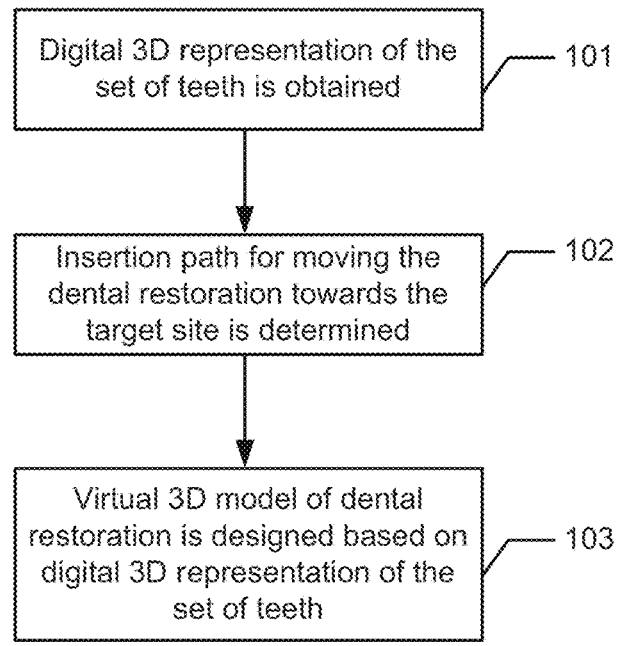
FIGS. 1A-1C show flowcharts for the embodiments of the method of designing a virtual 3D model of a dental restoration.
Figure 1B:
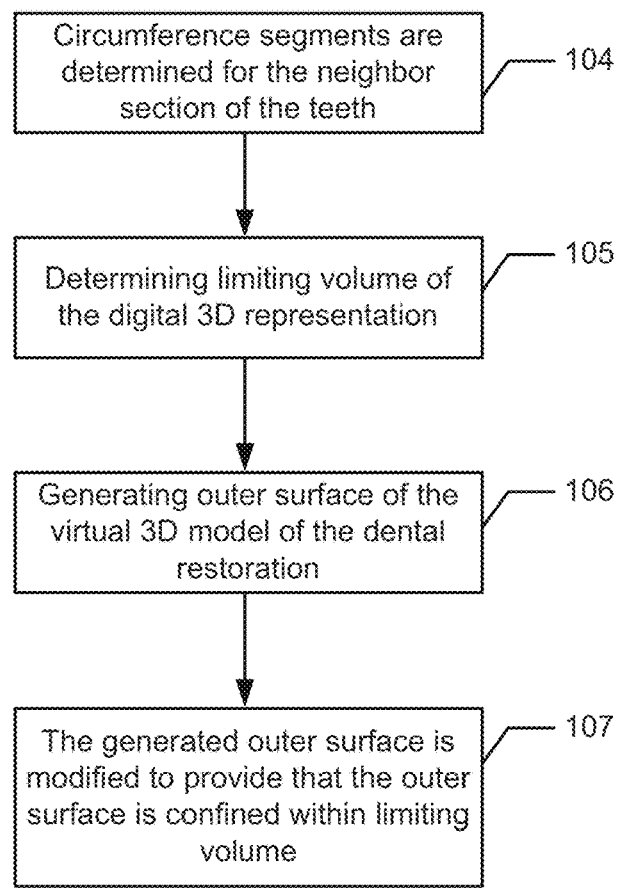
Figure 1C:
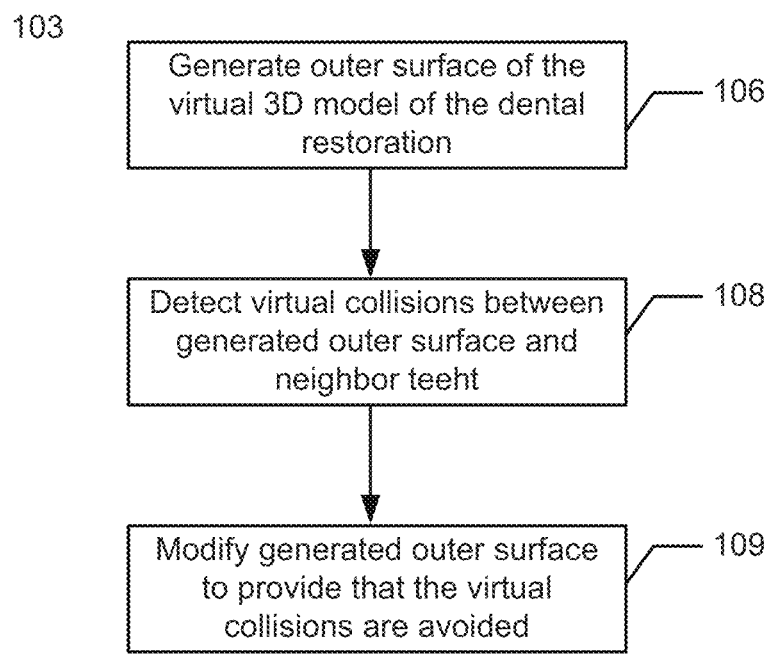

FIGS. 1A-1C show flowcharts for the embodiments of the method of designing a virtual 3D model of a dental restoration.

The flowchart 100 shows some steps of an embodiment of the method according to the invention for designing a virtual 3D model of a dental restoration such that a dental restoration manufactured from the virtual 3D model can be moved to the target site of the patient's set of teeth. In the following description the target site has a tooth prepared for accepting the dental restoration, but the target site could as well have an abutment secured in a dental implant. Further the mentioned dental restoration is a single crown restoration, but it could evidently also be a bridge restoration, at partial denture or the like.

In step 101 of FIG. 1A a digital 3D representation of the set of teeth is obtained. The digital 3D representation comprises a section corresponding to the target site with the prepared tooth and a neighbor section corresponding to at least one neighbor tooth located adjacent to the target site.

In step 102 the insertion path for moving the dental restoration towards the target site is determined. The insertion path may be determined by first providing an initial insertion path, i.e. an initial estimate of a suitable insertion path along which a manufactured dental restoration can move to the target site, and subsequently modifying the provided initial insertion path for instance based on the generated outer surface of the virtual 3D model of the dental restoration. The insertion path may be based on an insertion direction at the target site, i.e. the insertion direction at the section of the insertion path just before the dental restoration contacts the prepared tooth. In a software implementation and/or a user interface according to the invention, the insertion direction can also be determined by the operator using a pointing device such as a computer mouse.

In step 103, the virtual 3D model of the dental restoration is designed based on the digital 3D representation of the set of teeth. The designing comprises generating an outer surface of the virtual 3D model and optionally modifying the generated outer surface such that the outer surface is shaped in a way that allows a dental restoration manufactured from said virtual 3D model to be moved along the insertion path to the prepared tooth in the target site. I.e. the manufactured dental preparation can be inserted at the prepared tooth.

The designing can comprise a number of steps, such as obtaining an initial model of the virtual 3D model of the dental restoration (whereby the outer surface is generated), and shaping the generated outer surface by e.g. virtual sculpting or projecting it onto a boundary of a limiting volume.

The determined insertion path and the designed virtual 3D model of the dental restoration may be such that the dental restoration can be moved along the insertion path without collisions or with a limited and controlled displacement of one or both neighbor teeth.

A method for manufacturing a dental restoration is provided by adding to the steps of the method of designing a virtual 3D model an additional step of manufacturing the dental restoration from the virtual 3D model by e.g. direct digital manufacture. The direct digital manufacture may use additive processes, such as 3D printing, and/or subtractive processes, such as milling from a blank.

In FIG. 1B the designing 103 of the virtual 3D model of the dental restoration is based on a limiting volume of the digital 3D representation of the patient's set of teeth.

In step 104, circumference segments are determined for the neighbor section relative to the insertion path where the circumference segments are aligned with portions of tooth surfaces in the neighbor section.

When a slight movement of the neighbor teeth is accepted during the insertion of the dental restoration at the prepared tooth, a line may be defined by an offset of the circumference segment into the neighbor tooth.

In step 105, the limiting volume of the digital 3D representation is determined at least in part from the insertion path and the circumference segments or the offset line.

Part of the boundaries of the limiting volume can be determined by extending the circumference segments or the lines along the insertion path. This approach can be used both for the first and the second portion of the boundary, where the first and second portions are separated by the circumference segment or the line, and where the first portion is at the target site. Alternatively, the second portion can be shaped according to the surface of the teeth in the neighbor section such that the limiting volume above the circumference segment or the line resembles the actual space available for the manufactured dental restoration.

In some cases the boundary on one side of the target site is defined from the circumference segment aligned with a tooth portion while the boundary on the opposite side is determined from the offset line.

In step 106, the outer surface of the virtual 3D model of the dental restoration is generated. This may be generated by selecting an initial virtual 3D model of the dental restoration from a library or by using computer implemented algorithms configured for generating the outer surface based on the digital 3D representation of the patient's set of teeth.

Evidently the order of steps 105 and 106 are arbitrary and the outer surface of the virtual 3D model may be generated before the limiting volume is determined.

In step 107, the generated outer surface is modified to provide that the outer surface of the virtual 3D model is confined within limiting volume. This may be done by projecting portions of the generated outer surface which extends outside the limiting volume onto a boundary of the limiting volume. For a vertex based outer surface one method for pushing the portions is by virtually pushing vertices of the generated outer surface onto the boundaries of the limiting volume. This approach is suitable for providing smooth transitions at the intersections between the modified area and the originally generated area of the outer surface. The outer surface of the virtual 3D model can also be confined within the limiting volume by virtually cutting away portions of the generated outer surface which extends outside the limiting volume. This can be done using e.g. a Boolean operation.

In cases where a slight movement of the neighbor teeth is accepted the virtual 3D model of the dental restoration does not necessarily have to be confined within the limiting volume defined from the circumference segments. Besides the option of defining an offset line and determining the limiting volume from this offset line, there is also the possibility defining a virtual surface at a predetermined threshold distance from the limiting volume and modifying the generated outer surface to provide that the outer surface of the designed virtual 3D model is confined within the virtual surface. I.e. the virtual surface is used in the designing instead of or in addition to the limiting surface and there is no need for defining the offset line. In a user interface configured for visualizing the digital 3D representation of the teeth together with the virtual 3D model of the dental restoration, the limiting volume determined from the circumference segments can still be visualized relative to the digital 3D representation while the virtual 3D model is modified based on the virtual surface.

FIG. 1C shows an example of a work flow 103 where detection of virtual collisions between the generated outer surface and the neighbor section of the digital 3D representation of the patient's set of teeth is used for designing the virtual 3D model.

In step 106, the outer surface of the virtual 3D model of the dental restoration is generated. This may be generated by selecting an initial virtual 3D model of the dental restoration from a library or by using computer implemented algorithms configured for generating the outer surface based on the digital 3D representation of the patient's set of teeth.

The virtual collisions are detected in step 108. The virtual 3D model with the generated outer surface is virtually moved along the insertion path and collisions with the neighbor section of the digital 3D representation of the set of teeth are detected. The virtual collisions can be visualized to an operator using a user interface displayed on a computer screen on which the colliding portions of the generated outer surface are indicated e.g. by a coloring which differs from the color used for the remaining portions of the generated outer surface.

In step 109, the generated outer surface is modified to provide that the virtual collisions are avoided.

For every modification made, a new collision detection can be made such that changes in the collisions due to the modifications are determined as the modifications are made.

The changed collision is then visualized to the operator whereby he continuously receives information relating to which portions of the outer surface that are colliding with the neighbor teeth. The outer surface can be modified using e.g. a virtual sculpting tool of the user interface.

FIGS. 2A and 2B show a schematic presentation of the digital 3D representation of the patient's set of teeth with a circumference segment indicated on the neighbor section. In FIG. 2A the teeth are seen from the side, e.g., from the lingual side, and in FIG. 2B, the occlusal surfaces of the same teeth are seen.

The target site 211 of the obtained digital 3D representation 210 comprises a prepared tooth 212 which is prepared for accepting a dental restoration. The insertion path 213 of the digital 3D representation 210 is at least in part determined from the shape and the position of the prepared tooth relative to the neighbor section 214 of the set of teeth. The neighbor section 214 is here surrounding the target site 211. In other cases the neighbor section consists only of teeth at one side of the target site such that the target site and the neighbor section are adjacent. The circumference segments 215 of the neighbor section are located where the projections 2131 of the insertion path are tangential to the digital 3D representation 210.

In the occlusal view of FIG. 2B, the extent of the circumference segments 215 over the teeth of the neighbor section is seen. The tooth preparation 212 is within the target site 211 which is surrounded by the neighbor section 214 of the digital 3D representation of the patient's teeth. FIG. 2B further shows a set of points (A, B) marking the boundary of the cross sectional views of FIGS. 3A to 5D.

In the example illustrated in FIGS. 2A and 2B, the insertion path is linear with an angle relative to the normal to the occlusal plane. In some cases the insertion path is linear and parallel to said normal. In other cases, the insertion path is non-linear, optionally with linear sections.

In FIGS. 3A to 5D, the cross section of the target section and the neighbor section of the digital 3D representation of the set of teeth are shown together with the virtual 3D model of the dental restoration in a plane which is defined by a line extending along the arch between points A and B seen in FIGS. 2A and 2B and a normal to the occlusal plane of the patient's teeth.

FIG. 3 shows how a generated outer surface of the virtual 3D model of the dental restoration is modified based on a limiting volume of the digital 3D representation of the patient's set of teeth. The figure schematically illustrates the portion of the digital 3D representation corresponding to the target site and the surrounding neighbor section also seen in FIG. 2. The insertion direction 313 at the prepared tooth and the circumference segments 315 are the same as found in FIG. 2 with reference numbers shifted by 100.

Figure 3A:
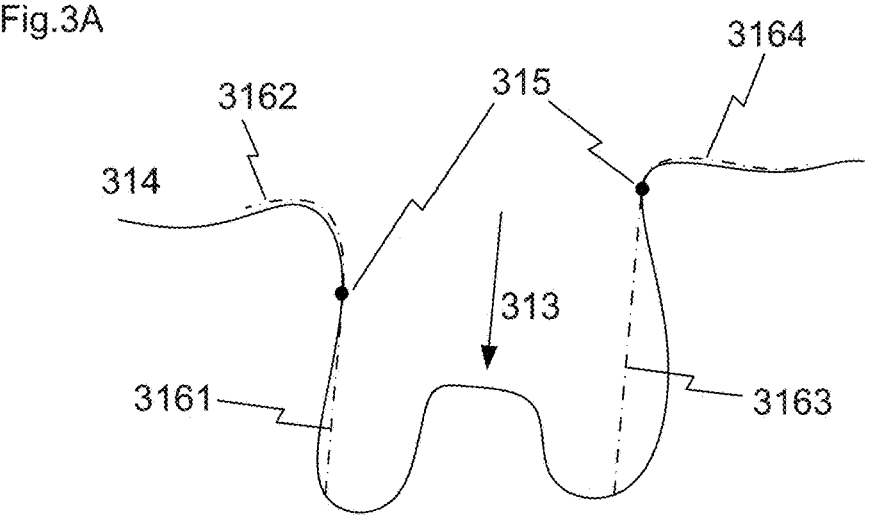
FIGS. 3A-3C show how a generated outer surface of the virtual 3D model of the dental restoration is modified based on a limiting volume of the digital 3D representation of the patient's set of teeth.

In FIG. 3A, a limiting volume with boundaries 3161, 3162, 3163, 3164 is determined from the insertion path 313 and the circumference segments 315 of the neighbor section 314. In some embodiments, the method comprises visualizing this limiting volume and/or the boundaries together with the digital 3D representation of the patient's set of teeth for guiding an operator when designing the virtual 3D model of the dental restoration. The boundaries have a first portion 3161, 3163 closest to the target site and a second portion 3162, 3164 where the two portions of one boundary are separated by the circumference segments 315. The lower portions 3161, 3163 are aligned with projections of the insertion path 313 which determined the locations of the circumference segments 315. The upper portions 3162, 3164 follows the surface of the neighbor section 314. At the upper portions 3162, 3164 the manufactured dental restoration is above the patient's set of teeth and can be moved freely. At the lower portions 3161, 3163, the teeth of the neighbor section 314 limit the movement of the dental restoration.

Figure 3B:
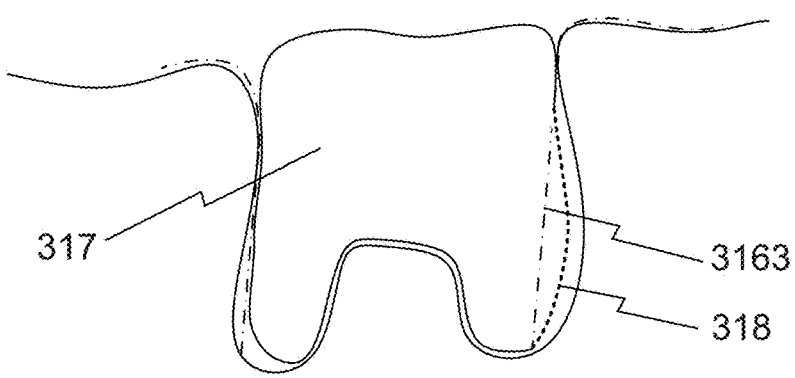

The outer surface of the virtual 3D model 317 of the dental restoration is generated at the target site as illustrated in FIG. 3B. With the design illustrated in FIG. 3B, a portion 318 (marked by the dotted line) of the generated outer surface extends outside the boundary 3163 of the limiting volume such that the virtual 3D model 317 with the generated outer surface is not confined within the limiting volume. A dental restoration manufactured from such a virtual 3D model cannot be inserted at the prepared tooth along the insertion path, at least not without moving the neighbor teeth while moving the dental restoration to the target site.

Figure 3C:
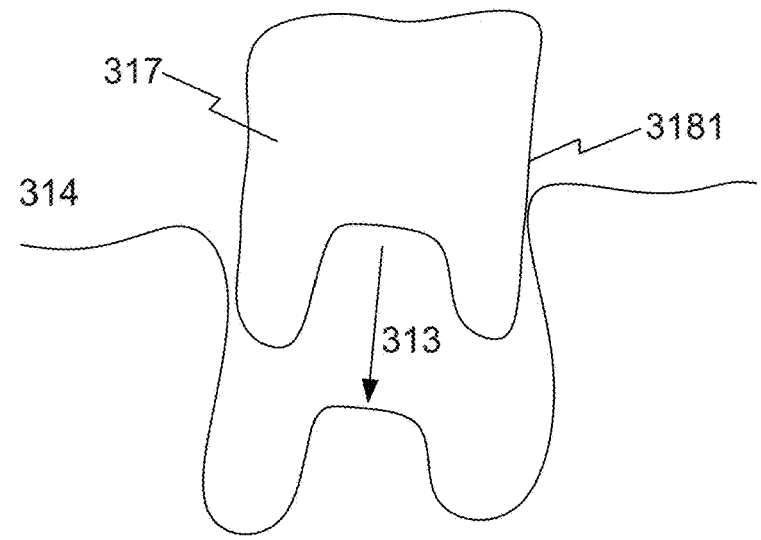

By modifying the generated outer surface such that it is shaped according to the boundary 3163 the design of the virtual 3D model becomes such that the manufactured dental restoration 317 can be moved to the target site along the insertion path 313 as illustrated in FIG. 3C. The modified outer surface 3171 of the designed virtual 3D model can be shaped by projecting the generated outer surface onto the boundary 3161 of the limiting volume or by sculpting the generated outer surface using e.g. a virtual sculpting tool.

In the example of FIG. 3A-3C, the insertion path 313 is tilted relative to the longitudinal axis of the teeth in the neighbor section 314. This causes the limiting volume to overlap with the portion 318 of the virtual 3D model of the dental restoration. If a dental restoration is manufactured from the virtual 3D model of FIG. 3B it cannot be inserted at the target site along the insertion path 313. However in some cases, the insertion path can be modified to account for the overlap that would occur if the dental restoration was moved along an insertion path determined solely from the insertion direction. At some distance from the target site, the insertion path may in such cases follow a different direction such that the virtual overlap can be avoided while the insertion path 313 still is aligned with the insertion direction at the prepared tooth. The insertion path 313 can be derived by combining the insertion direction at the prepared tooth with a second insertion direction at the occlusal plane of the teeth, such as a vertical insertion direction. FIGS. 4A and 4B show how the invention can be applied to a situation where a part of the equator line of the generated outer surface of a virtual 3D model of the dental restoration is located below the corresponding circumference segment of the neighbor section of the digital 3D representation of the patient's set of teeth and outside the limiting volume.

In this example, the insertion path 413 is straight and vertical, i.e. it is perpendicular to the occlusal plane. The generated outer surface is such that the equator line 419 of the virtual 3D model 417 of the dental restoration is located below the corresponding circumference segment 415 of the neighbor section 414 as seen in FIG. 4A.

FIG. 4B shows a close-up of the right hand side of FIG. 4A with a portion 418 of the generated outer surface extending outside the boundary 4163 of the limiting volume such that the virtual 3D model 417 is not confined within the limiting volume.

The virtual 3D model is then modified with the modified outer surface 4181. being shaped such that the virtual 3D model 417 is confined within the limiting volume. This can be done by e.g. pushing vertices of the generated outer surface onto the boundary 4163 of the limiting volume or by virtually cutting the virtual 3D model 417 to the boundary. With this modification the manufactured dental restoration can be moved along the insertion path 413 to be inserted at the prepared tooth as illustrated in FIG. 4C.

Figure 5A:
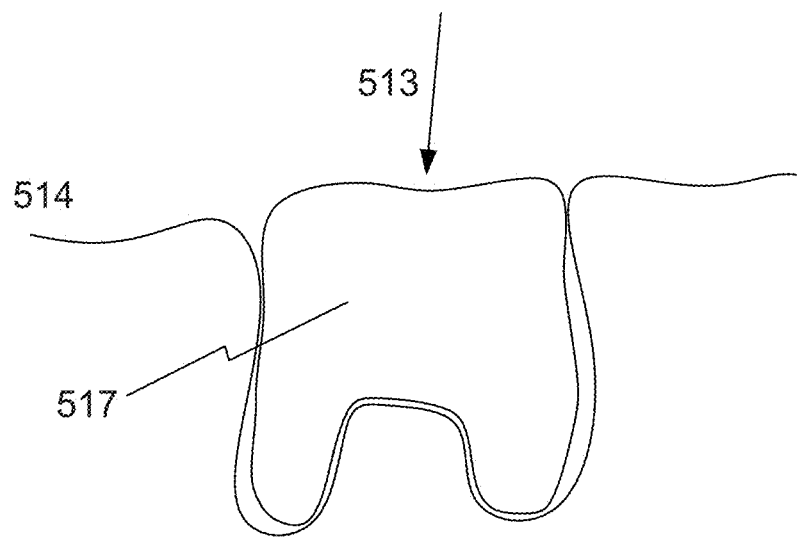
FIGS. 5A-5D show an example of how the generated outer surface can be modified based on detecting virtual collisions.
Figure 5B:
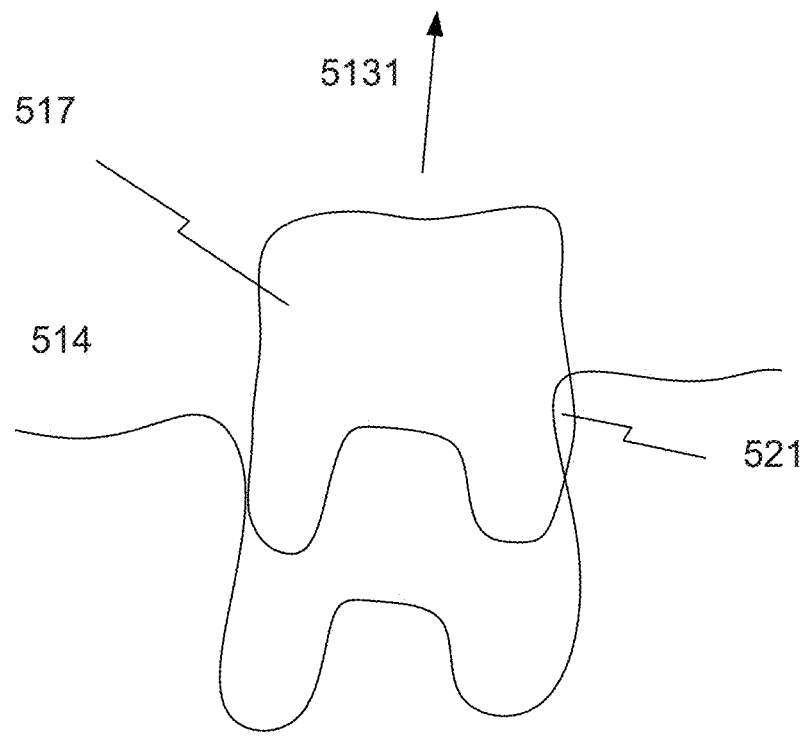
Figure 5C:
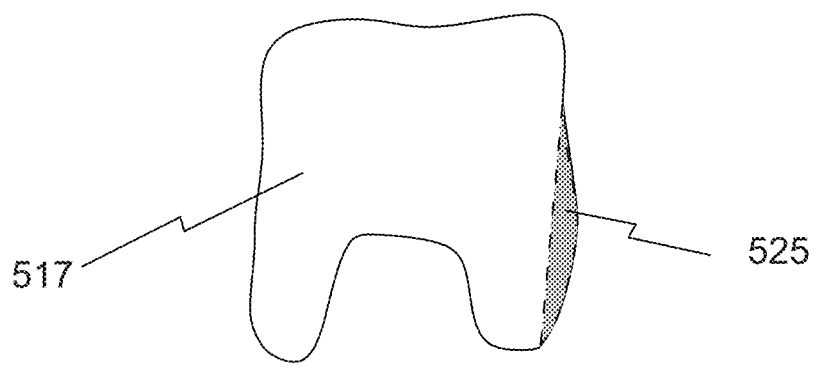
Figure 5D:
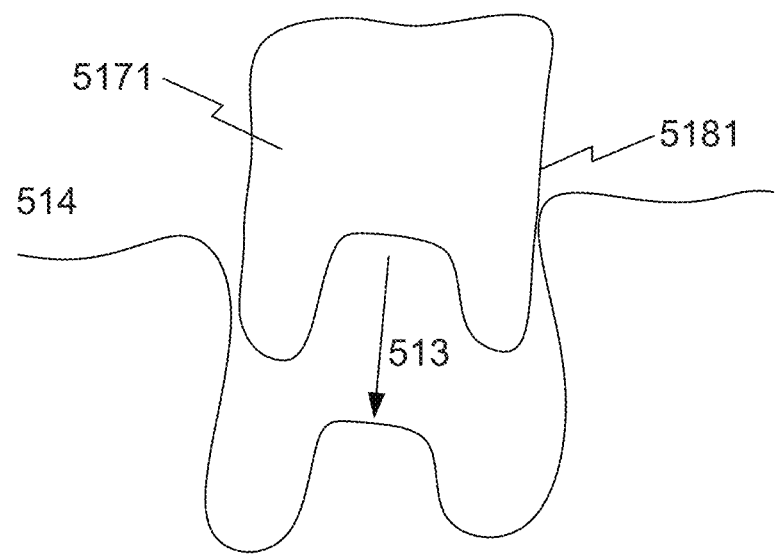

FIGS. 5A and 5D show an example of how the generated outer surface can be modified based on detecting virtual collisions between the generated outer surface and the neighbor section of the digital 3D representation of the set of teeth.

In FIG. 5A, the outer surface of the virtual 3D model 517 of the dental restoration is generated e.g. from a template model of a library. Also in the figure is illustrated the insertion direction 513 of the prepared tooth and the neighbor section 514 of the digital 3D representation of the set of teeth.

As illustrated in FIG. 5B, the virtual 3D model is then virtually moved along the insertion path and virtual collisions between the volume of the virtual 3D model 517 defined by the generated outer surface and teeth of the neighbor section 514 are detected. The virtual movement is here illustrated as a movement 5131. in the direction opposite to the direction of the insertion path corresponding to a movement away from the target site, but the movement could also be from a starting point to the target site, where the starting point is derived from the target site and the insertion path. With the shape of the virtual 3D model 517 being defined by the generated outer surface, the volume of the virtual 3D model and a tooth of the neighbor section 514 have an overlap 521 for some positions along the insertion path.

The portion of the virtual 3D model 517 of the dental restoration which virtually collides with the neighbor section is then found by adding the overlaps for all the relevant positions along the insertion path. The detected virtual collision 525 can then be visualized to the operator as illustrated in FIG. 5C and/or be used for modifying the outer surface of the virtual 3D model. Based on this visualization the operator can modify the outer surface of the virtual 3D model such that the virtual collision with the neighbor section is avoided. In some embodiments, the changes in the virtual collisions caused by the modification of the outer surface of the virtual 3D model are determined for every modification of the virtual 3D model, such that the effect of the changes can be visualized in real-time.

The modification of the generated outer surface provides a modified outer surface 5181 which is such that the dental restoration manufactured from the designed virtual 3D model 5171 can be moved along the insertion path 513 to the target site as illustrated in FIG. 5D.

Figure 6B:
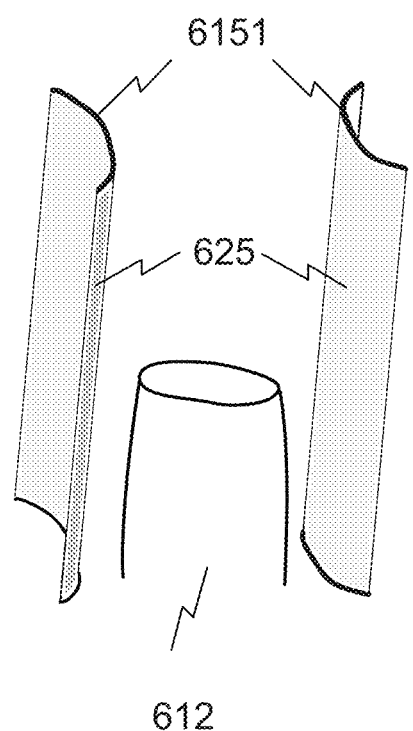

FIGS. 6A and 6B show how part of the boundaries of the limiting volume can be determined.

FIG. 6A shows an example of how the circumference segments 615 of the neighbor section of the digital 3D representation 610 of the patient's set of teeth can be extended along the insertion path 613. The surfaces 625 spanned by these extended circumference segments can then be identified as part of the boundaries of the limiting volume. In some embodiments, the virtual 3D model of the dental restoration is designed for the prepared tooth 612 in such a manner that the outer surface is confined within these boundaries. In some embodiments, a limited movement of the neighbor teeth is allowable and the virtual 3D model is allowed to extend outside the boundary of the limiting volume. How far the virtual 3D model is allowed to extend outside the limiting volume can be controlled via a predetermined threshold distance e.g. entered by an operator.

In FIG. 6B the part of the boundaries 625 of the limiting volume are illustrated together with the prepared tooth for which the dental restoration is designed and manufactured. Here the extended circumference segments extend to the upper edges 6151.

When designing the virtual 3D model of the dental restoration at the target site the boundaries 625 can be visualized together with the virtual 3D model or the portion of the outer surface of the virtual 3D model extending beyond the boundaries can be visualized to the operator. The boundaries can be visualized as a semi-transparent surface such that the outer surface of the virtual 3D model can be seen even when it extends beyond the boundaries.

At the lingual and buccal side of the target site, the limiting volume may in practice be open since no part of the digital 3D representation of the set of teeth is present there to block the movement of the manufactured dental restoration.

Figure 7:
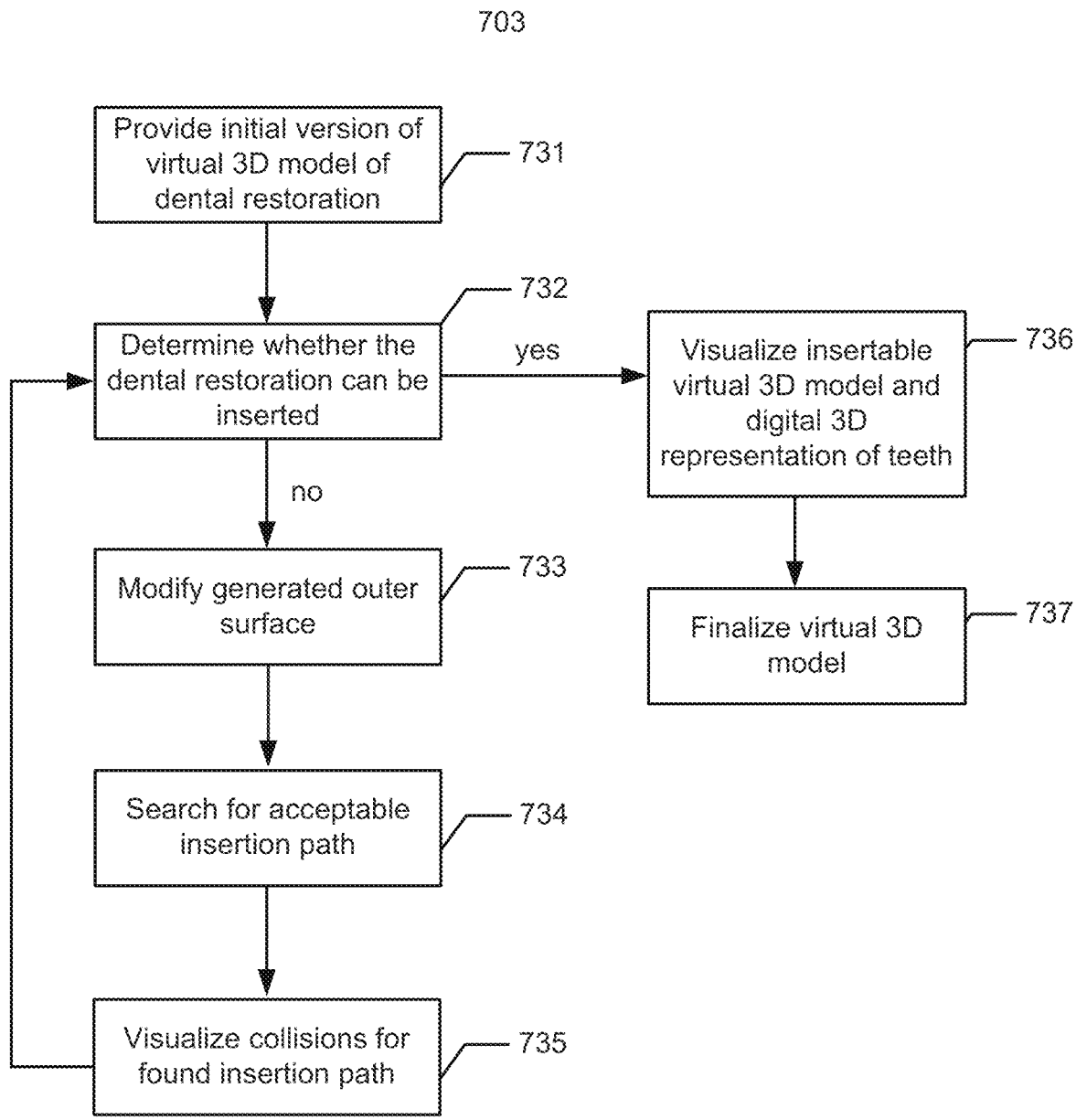
FIG. 7 shows an example of iterative processes in the method.

FIG. 7 shows an example of iterative processes in the method.

In this iterative process, the designing 703 of the virtual 3D model of the dental restoration starts from an initial version of the virtual 3D model provided in step 731. By providing the initial version of the virtual 3D model, the outer surface of the virtual 3D model is generated.

In step 732 is determined whether a dental restoration manufactured from the virtual 3D model can be inserted at the target site. This can e.g. be determined from the virtual collision detection where the virtual 3D model is virtually moved along the insertion path and the overlap between the volume of the virtual 3D model and the volume of the neighbor section of the patient's set of teeth is determined.

If the dental restoration cannot be inserted at the target site, steps 733-735 are performed.

In step 733, the outer surface is modified, e.g., by manually sculpting the virtual 3D model to avoid or at least reduce the virtual collisions.

In step 734 is searched for an acceptable insertion path for the virtual 3D model with the modified outer surface or for a range of insertion paths which together forms an insertion path cone in which cone an arbitrary chosen insertion path is acceptable. The acceptable insertion path may be the initially chosen insertion path or a modified insertion path.

In step 735 the portion of the virtual 3D model which virtually collides with teeth of the neighbor section is visualized for the found insertion path.

Step 732 is then repeated and the operator and/or a computer implemented algorithm decide whether a dental restoration manufactured from the modified virtual 3D model can be inserted at the target site. If this is still not the case, steps 733-735 are repeated until the dental restoration can be inserted at the target site.

When it is determined in step 732 that the dental restoration can be inserted, the method proceeds to steps 736 and 737.

In step 736, the virtual 3D model, which was found to be insertable is visualize together with the digital 3D representation of the set of teeth such that the operator can evaluate the adequateness of the virtual 3D model of the dental restoration.

In step 737 the virtual 3D model is finalized and prepared for CAM manufacture.

With the method described here, the collisions of the virtual 3D model are visualized for each modification of the outer surface of the virtual 3D model and/or for the change of insertion path. This has the advantage that an operator continuously receives information relating to how adequate the present form of the virtual 3D model is. When deciding by use of a computer implemented algorithm the collisions need not necessarily be visualized and step 735 may be omitted in some iterations.

An iterative method can also be based on the limiting volume approach in which is determined whether the generated outer surface of the virtual 3D model is confined within the limiting volume. If this is not the case, the insertion path may be adjusted whereby the boundaries of the limiting volume also changes. The change in limiting volume and the corresponding change in the portion of the virtual 3D model which extends beyond the limiting volume can be visualized for each insertion path. When modifying the insertion path, the operator can then select an insertion path which is the most adequate. In this respect the most adequate insertion path may be the one where the portion of the virtual 3D model of the dental restoration which must be removed, i.e. the portion extending beyond the limiting volume, has the smallest impact on the manufactured dental restoration.

When the final insertion path has been found, the outer surface of the virtual 3D model is modified either automatically by e.g. cutting the generated outer surface to the boundaries of the limiting volume or by manually sculpting the virtual 3D model. The designed virtual 3D model, which was found to be insertable can then be visualized together with the digital 3D representation of the set of teeth such that the operator can evaluate the adequateness of the final virtual 3D model of the dental restoration. Finally the virtual 3D model is finalized and prepared for CAM manufacture.

Figure 8A:
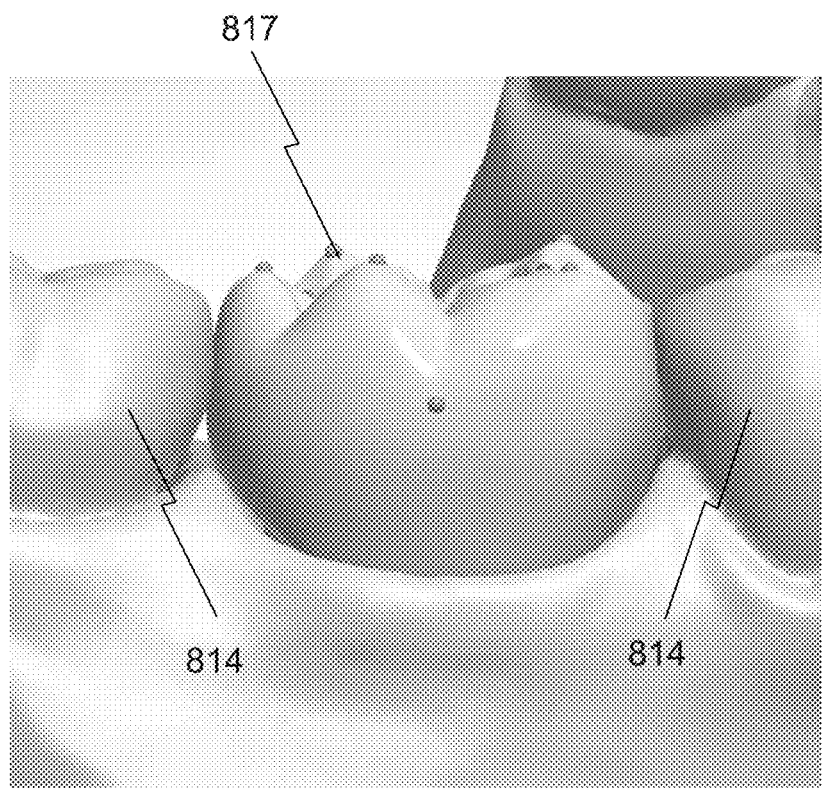
FIGS. 8A-8F show an embodiment of the method where the generated dental restoration is modified based on a limiting volume.
Figure 8B:
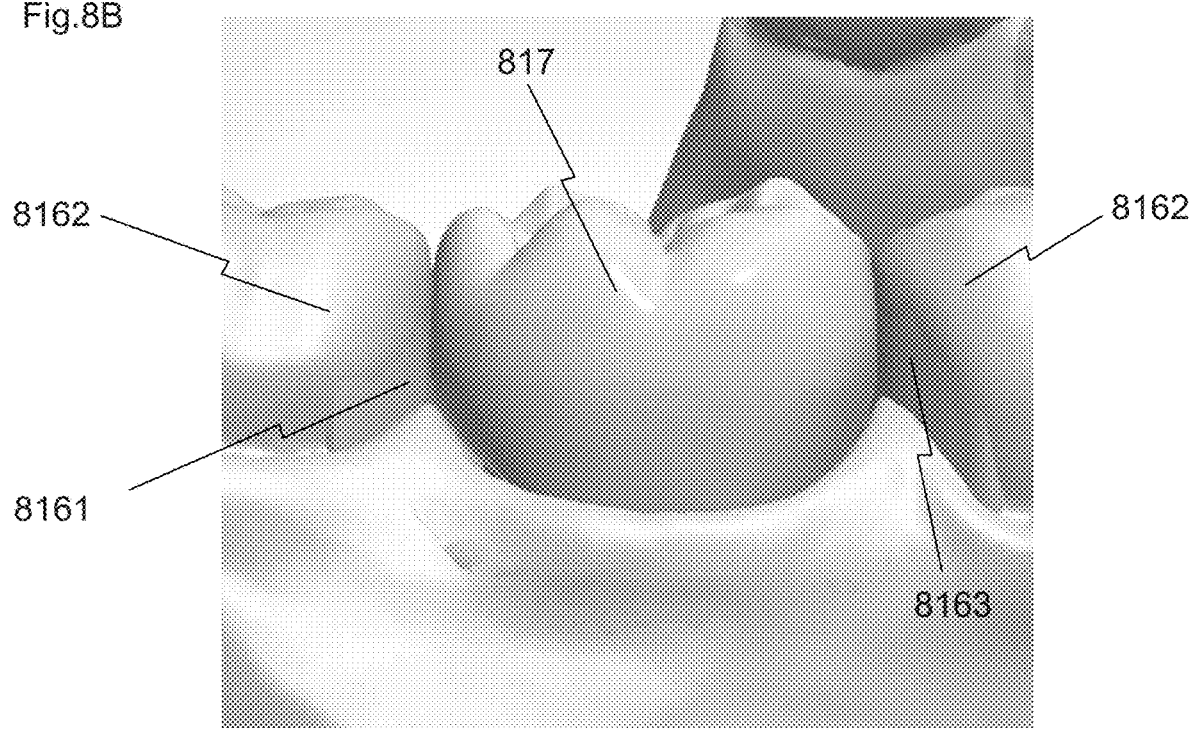

FIGS. 8A-8F show shows screen shots from a computer implementation of an embodiment of the method where the generated outer surface of the virtual 3D model of the dental restoration is modified based on a limiting volume FIG. 8A shows a generated outer surface of a virtual 3D model 817 of the dental restoration and the teeth of the neighbor section 814 of an obtained digital 3D representation of the patient's set of teeth. The outer surface of the virtual 3D model 817 is generated at the target site and at the target site there are no collisions with the teeth of the neighbor section 814. The generated outer surface of the virtual 3D model is however such that a dental restoration manufactured from the illustrated form of the virtual 3D model cannot be inserted into the patient's set of teeth due to collisions with the neighbor teeth.

FIGS. 8B to 8H show how the generated outer surface of the virtual 3D model can be modified such that a dental restoration manufactured from the designed virtual 3D model can be inserted along a vertical insertion path, i.e., along an insertion path which is perpendicular to the occlusal plane of the set of teeth.

The boundary of a limiting volume for the neighbor section of the set of teeth is in part determined by a virtual block-out of the undercut regions of the neighbor section, such that the first portions of the boundaries 8161, 8163 closest to the target site are determined from a virtual surface generated by a virtual block-out of the neighbor section. The second portions of the boundaries 8162, 8164 are shaped according to the surfaces of the teeth in the neighbor section 814 that were not blocked out.

Figure 8C:
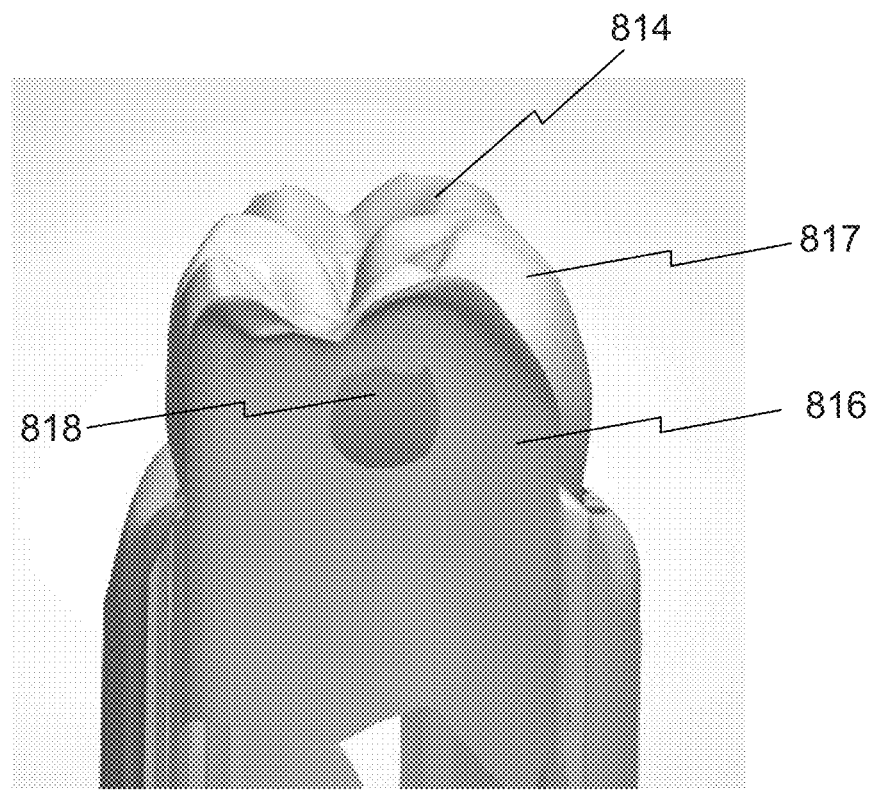

FIG. 8C shows the virtual 3D model 817, one boundary 816 of the limiting volume and the tooth of the neighbor section 814 opposite to the boundary. These entities are arranged in the same way as in FIG. 8B and are in FIG. 8C viewed from the left hand side of FIG. 8B. A portion 818 of the generated virtual 3D model extends outside the boundary 816 of the limiting volume such that the virtual 3D model 817 is not confined within the limiting volume. In some cases, the operator may conclude that amount of the overlap between the virtual 3D model and the limiting volume is insignificant and that a dental restoration manufactured from the virtual 3D model can be inserted with an acceptable movement of the teeth of the neighbor section.

Figure 8D:
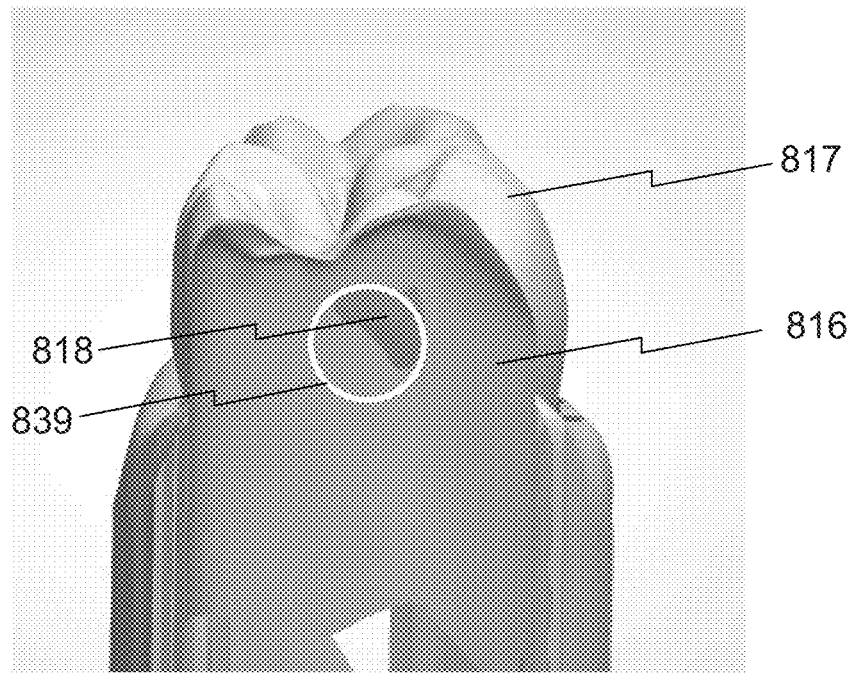

In other cases the operator may decide that the generated outer surface of the virtual 3D model 817 must be modified and chose to use a virtual sculpting tool 839 to modify the portion 818 of the generated outer surface of the virtual 3D model 817 as illustrated in FIG. 8D. In the case illustrated in FIGS. 8A-8F, the outer surface is pushed to a virtual surface defined 0.01 mm from the boundary of the limiting volume into the tooth of the neighbor section. The operator could also decide to push the outer surface to fit exactly to the boundary or to have an even larger distance between the boundary and the outer surface.

Figure 8E:
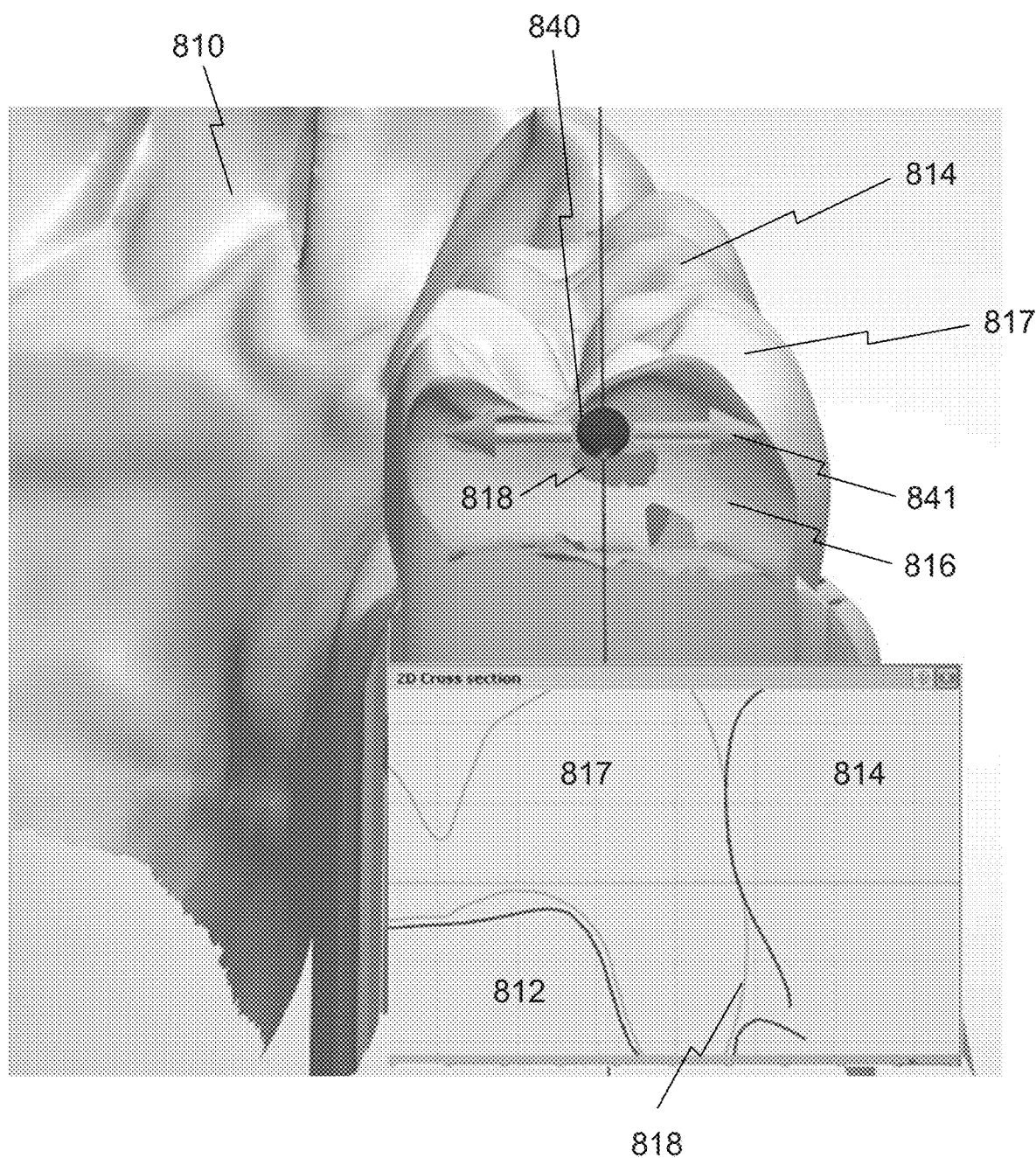

FIG. 8E shows a screen shot of the boundary of the limiting volume 816, the virtual 3D model 817 of the dental restoration and several teeth of the digital 3D representation of the set of teeth 810, all viewed from the same viewpoint as in FIGS. 8C and 8D. A cross section of the virtual 3D model 817 and the neighbor section 814 has been determined for the plane defined by the point of origin 840 and the normal 841. The cross section is seen in the insert of the figure where right hand side of the insert is closest to the viewpoint. In the insert is seen the cross sections of the virtual 3D model 817, the tooth of the neighbor section, and a prepared tooth 812 in the target site. The portion 818 of the virtual 3D model which extends outside the boundary of the limiting volume is here seen as a surface which extends into the undercut region of the neighbor section. The cross sections seen in the insert confirms that the virtual 3D model of the dental restoration must be modified in order to ensure that the dental restoration can be inserted at the target site.

Figure 8F:
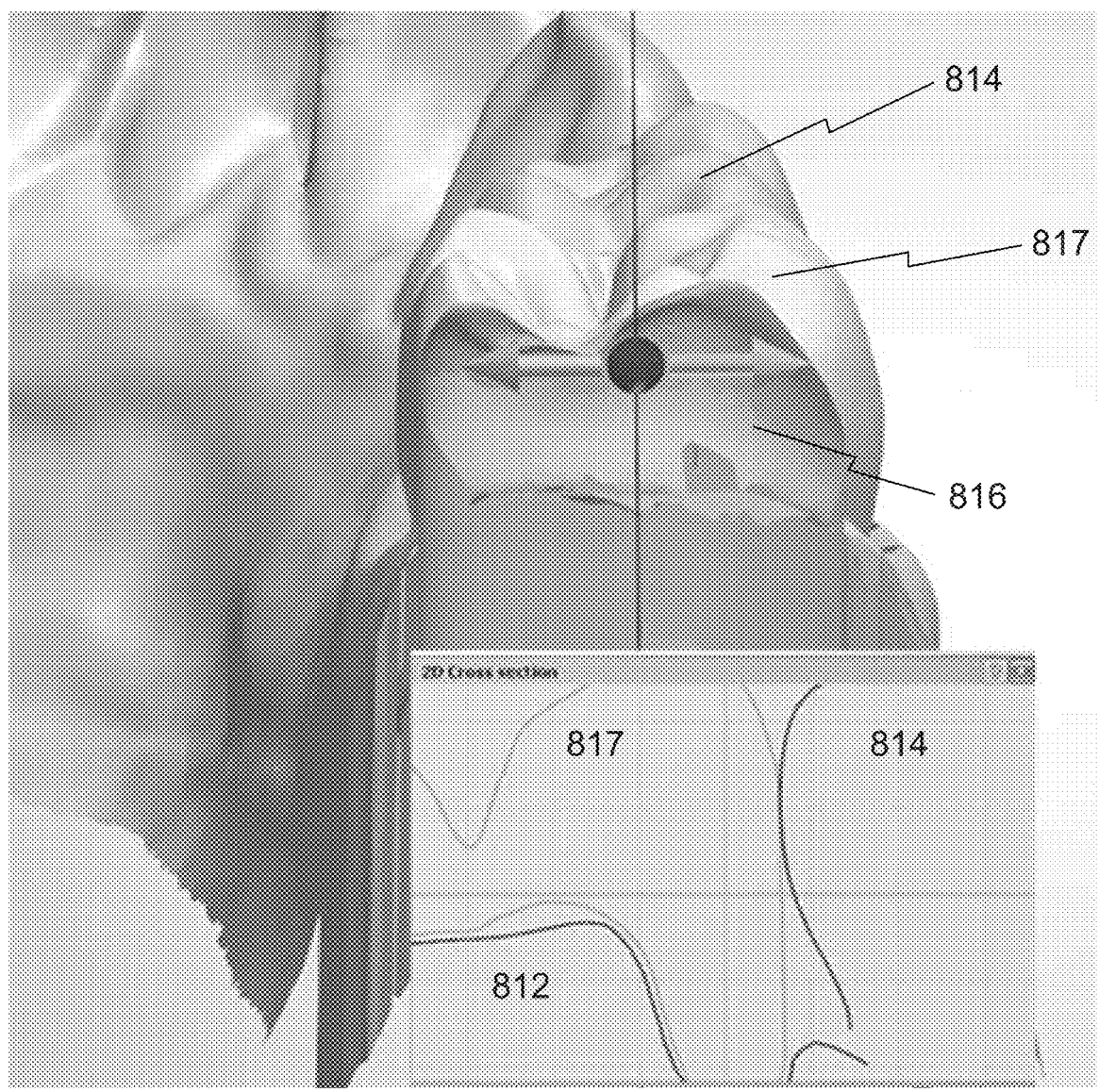

With the sculpting described in relation to FIG. 8D is performed on the virtual 3D model seen in FIG. 8E, the overlapping region of the generated outer surface with the limiting volume is removed and a dental restoration manufactured from the designed virtual 3D model 817 can now be inserted at the target site as illustrated in the insert of FIG. 8F where the virtual 3D model no longer has a portion which extends into the undercut region of the neighbor section. When the same modification is performed on the opposite side of the virtual 3D model (if required) a dental restoration manufactured from the virtual 3D model which can be inserted at the target site.

Figure 9:
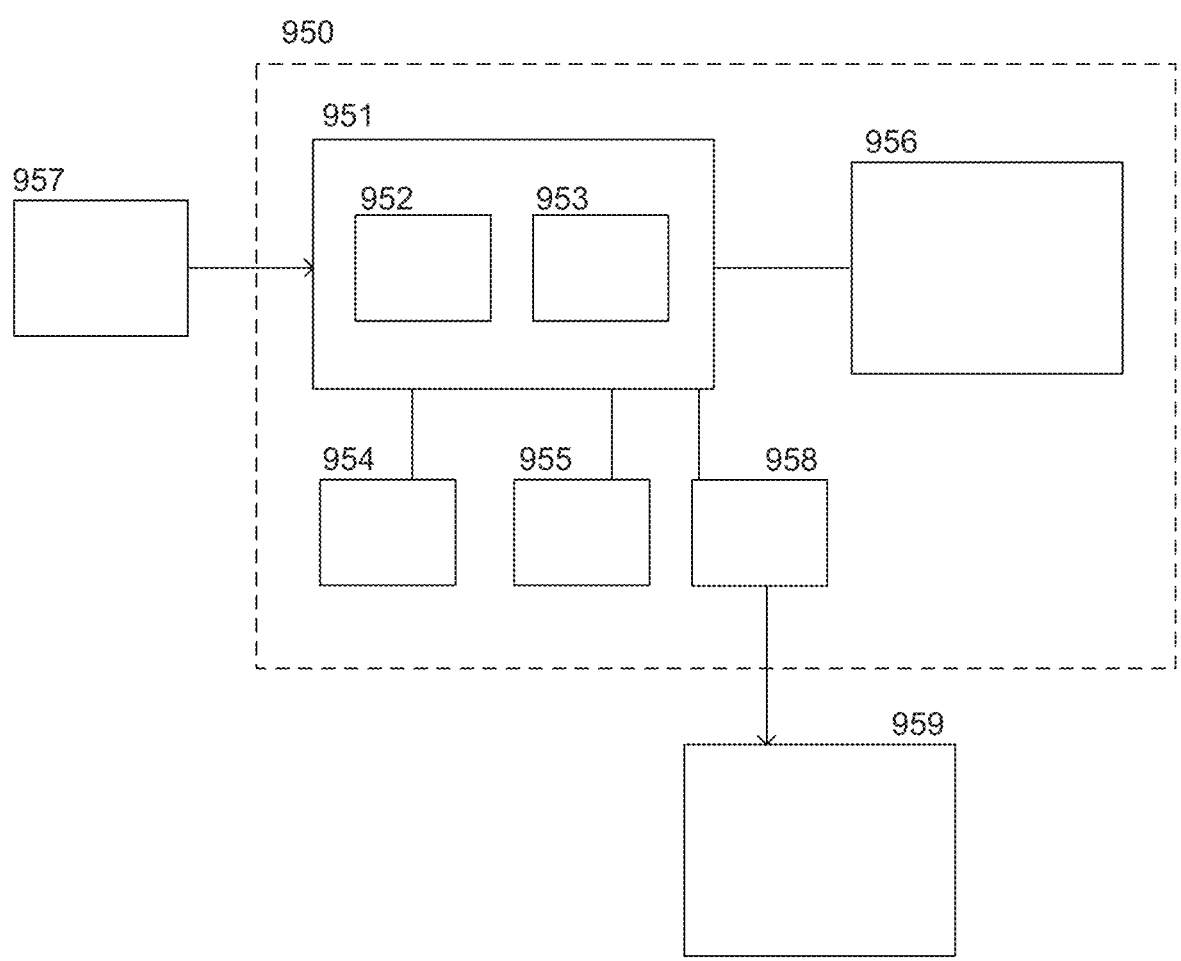
FIG. 9 shows a schematic of a system according to an embodiment of the present invention.

FIG. 9 shows a schematic of a system according to an embodiment of the present invention. The system 950 comprises a computer device 951 comprising a computer readable medium 952 and a processor 953. The system further comprises a visual display unit 956, a computer keyboard 954 and a computer mouse 955 for entering data and activating virtual buttons visualized on the visual display unit 956. The visual display unit 956 can be a computer screen. The computer device 951 is capable of receiving a digital 3D representation of the patient's set of teeth from a scanning device 957, such as the TRIOS intra-oral scanner manufactured by 3shape A/S, or capable of receiving scan data from such a scanning device and forming a digital 3D representation of the patient's set of teeth based on such scan data. The received or formed digital 3D representation can be stored in the computer readable medium 952 and provided to the processor 953. The processor 953 is configured for determining an insertion path for the dental restoration to the target site based on the digital 3D representation; and for designing a virtual 3D model of the dental restoration based on the digital 3D representation of the set of teeth using the method according to any of the embodiments. In the designing of the virtual 3D model and in the determining an insertion path, one or more options can be presented to the operator, such as whether to project the generated outer surface of the virtual 3D model onto a boundary of a limiting volume or to virtually cut the generated outer surface to the boundary. Other options can relate to numerical values for e.g. the maximum allowable overlap between the virtual 3D model and the neighbor section of the digital 3D representation of the patient's set of teeth. The options can be presented in a user interface visualized on the visual display unit 956.

The system comprises a unit 958 for transmitting the designed virtual 3D model to e.g. a computer aided manufacturing (CAM) device 959 for manufacturing the dental restoration or to another computer system e.g. located at a milling center where the dental restoration is manufactured. The unit for transmitting the virtual 3D model can be a wired or a wireless connection.

The scanning of the patient's set of teeth using the scanning device 957 can be performed at a dentist while the designing of the virtual 3D model of the dental restoration is performed at a dental laboratory. In such cases the digital 3D representation of the patient's set of teeth can be provided via an internet connection between the dentist and the dental laboratory.

Figure 10A:
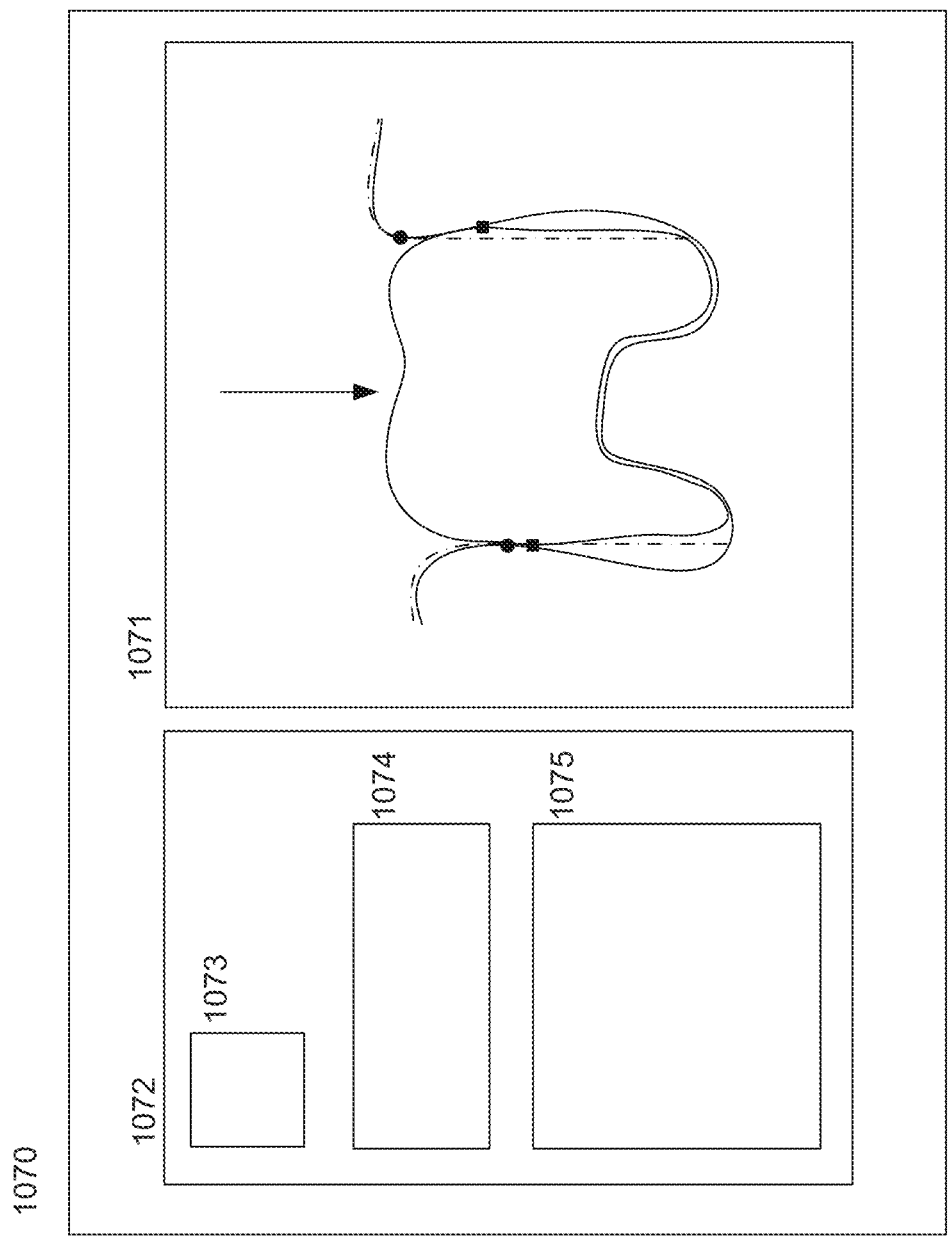

FIGS. 10A-10C show a schematic of a user interface according to an embodiment of the invention.

FIG. 10A shows a first part 1071 of the user interface 1070 in which cross sections of a generated outer surface of the virtual 3D model of the dental restoration, a portion of the digital 3D representation corresponding to the target site and a surrounding neighbor section are is seen together with the insertion direction and the boundary of a limiting volume determined from a circumference segment of the digital 3D representation. The orientation of the insertion path can be changed using a pointing tool such as a computer mouse.

The second part 1072 of the user interface comprises a data entering section 1074 for entering data relating to e.g. the allowed overlap between the virtual 3D model of the dental restoration and the neighbor section of the digital 3D representation of the teeth. The second part further comprises a section 1075 for presenting cross sectional representations of the virtual 3D model and the neighbor section and their overlap at these cross sectional views. A virtual push button 1073 is configured for providing that the data entered in the data entering section 1074 are applied either directly to the generated outer surface of the virtual 3D model or to a virtual tool used for modifying the virtual 3D model. The virtual tool can be a virtual sculpting tool which is used to select which portions of the virtual 3D model shall be modified according to the data entered in the data entry section 1074.

The user interface can be visualized on a visual display unit, such as a computer screen being part of a system configured for implementing the method according to the present invention.

In FIGS. 10B and 10C are shown a simplified presentation of the user interface showing only the first part 1071 and the virtual push button 1073. In the first part, a situation corresponding to the case described in relation to FIG. 4A is seen. The generated outer surface of the virtual 3D model 1017 of the dental restoration extends outside the boundary of the limiting volume 1016 and the operator wishes to modify the outer surface such that in the designed virtual 3D model the outer surface is confined within the boundary of the limiting volume. The user has accordingly entered this choice in the data entering section 1074 illustrated in FIG. 10A and when pressing the virtual push button 1073 this choice is applied directly to the virtual 3D model, such that the outer surface is confined within the boundary of the limiting volume as seen in FIG. 10C.

Figure 11A:
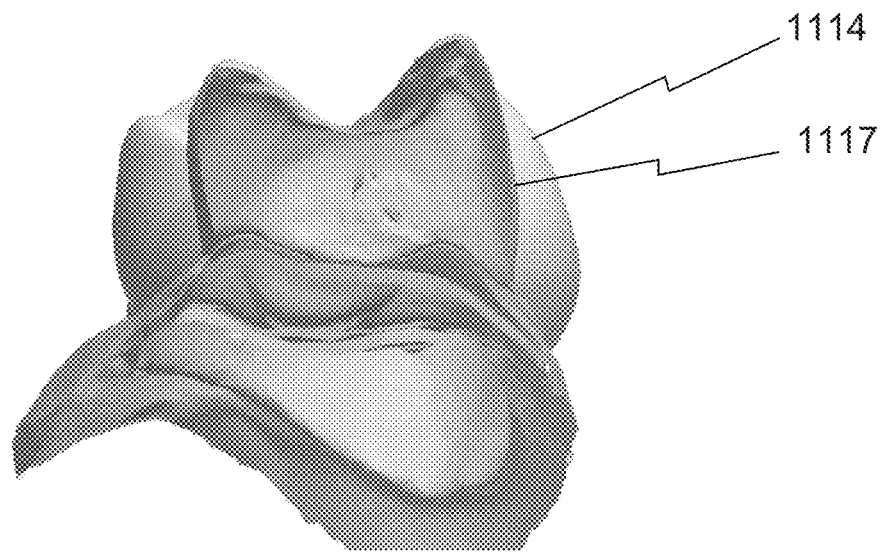
FIGS. 11A-11C and 12A-12C illustrate the problem solved by the invention.
Figure 11B:
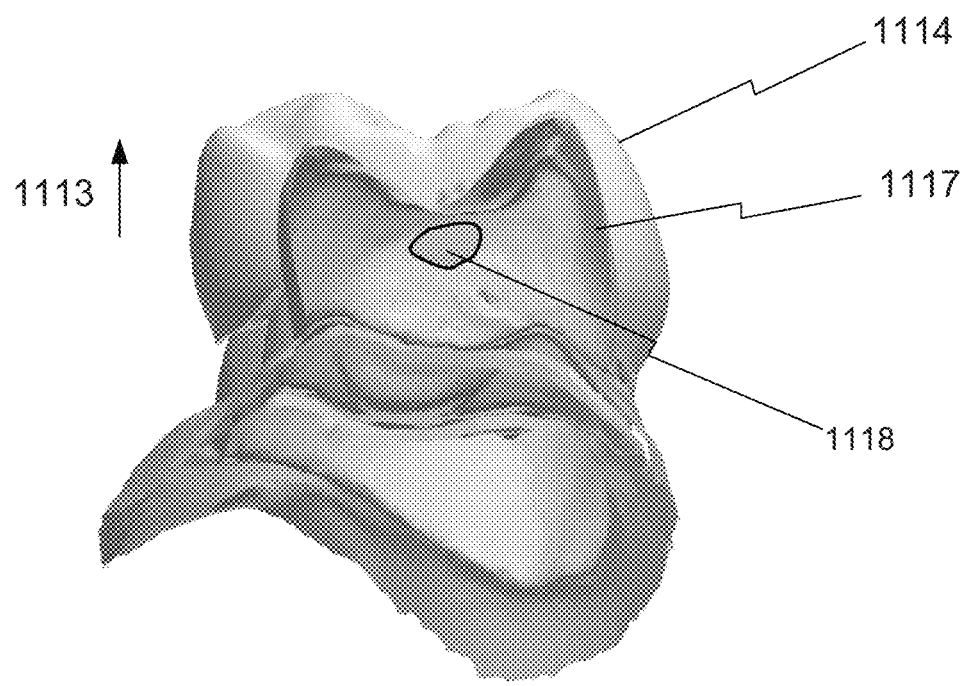
Figure 11C:
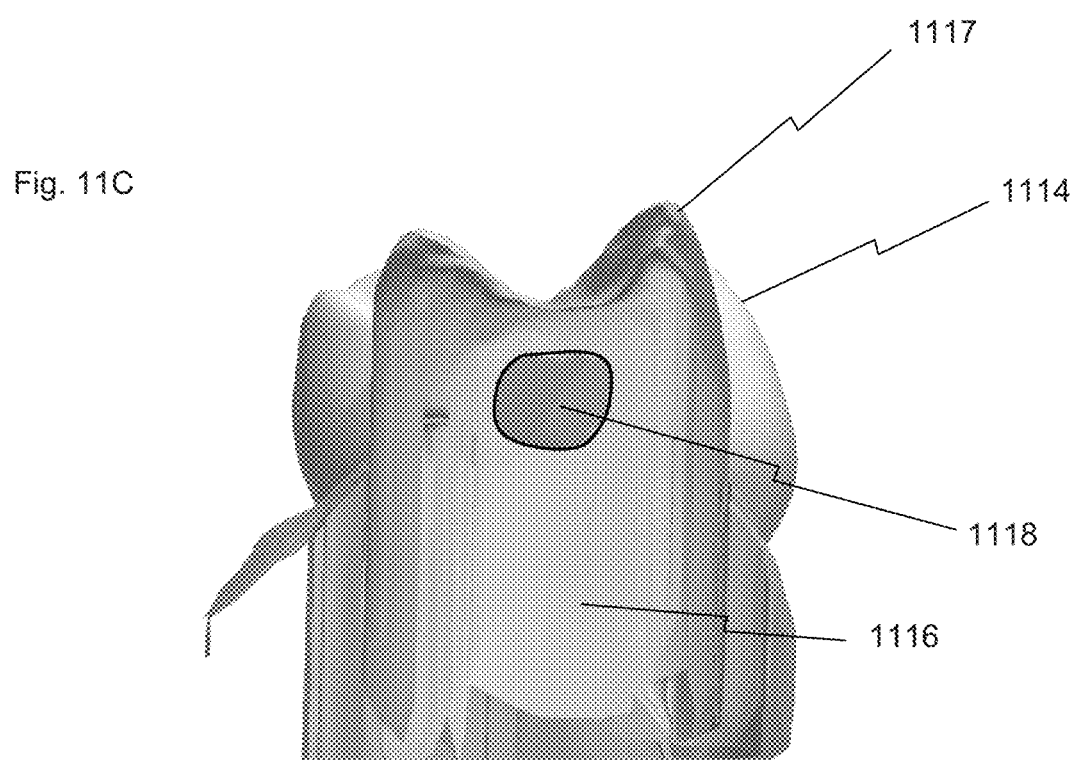

FIGS. 11A-11C show computer screen shots illustrating the problem solved by the invention.

FIG. 11A shows a generated outer surface of a virtual 3D model 1117 of the dental restoration and the teeth of the neighbor section 1114 of an obtained digital 3D representation of the patient's set of teeth seen along a line parallel to the dental arc at the target site. The outer surface of the virtual 3D model 1117 is generated at the target site and at the target site there are no collisions with the teeth of the neighbor section 1114.

The generated outer surface of the virtual 3D model is however such that a dental restoration manufactured from the illustrated form of the virtual 3D model cannot be inserted into the patient's set of teeth due to collisions with the neighbor teeth. As illustrated in FIG. 11B, a part 1118 of the generated outer surface 1117 intersects the teeth of the neighbor section 1114 when the dental restoration is moved along the insertion path. For the manufactured dental restoration this would correspond to a collision between the restoration and the neighbor teeth. FIG. 11B shows the virtual 3D model in one position along the insertion path. The portion of the virtual 3D model 1117 which virtually collides with the neighbor section 1114 can be found by adding the collisions for all the relevant positions along the insertion path.

The portion of the virtual 3D model 1117 which virtually collides with the neighbor section 1114 can also be found be determining a limiting volume of the digital 3D representation of the teeth. The boundary 1116 of the limiting volume is here defined by a virtual block-out of the neighbor teeth below the circumference of the neighbor tooth and the surface of the tooth above the circumference line. The outer surface of the virtual 3D model generated at the target site does not intersect the digital 3D representation of the teeth but it intersects the boundary 1116 of the limiting volume and the intersecting portion 1118 must be removed if a collision-free insertion path for the manufactured dental restoration to the target site is wanted.

Figure 12A:
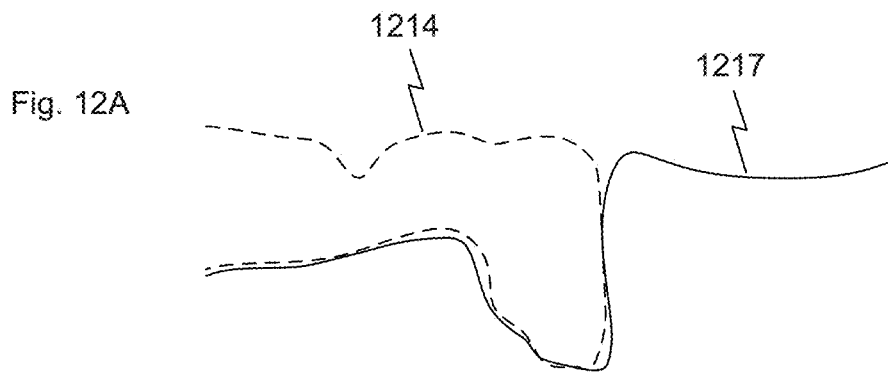
Figure 12B:
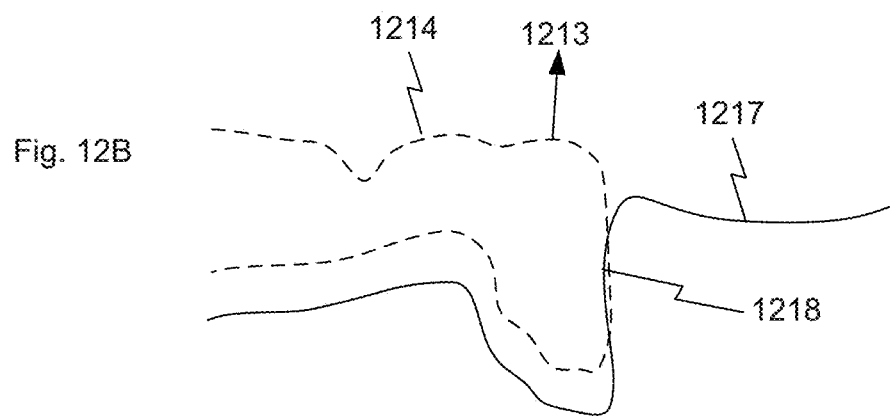
Figure 12C:
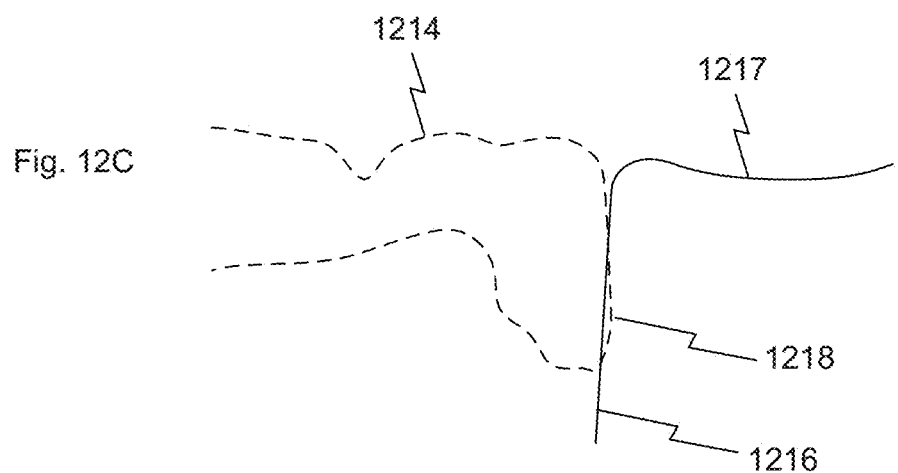

FIGS. 12A-12C cross sectional view of the screen shots of FIGS. 11A-11C.

The cross sections are of the virtual 3D model 1117 and the neighbor section 1114 in a plane which is parallel to the dental arch at the target site and normal to the occlusal surface of the teeth. The right hand side of the cross sections is closest to the viewer when looking at the screen shots of FIGS. 11A-11C.

FIG. 12A shows the outer surface of a virtual 3D model 1217 generated at the target site of the obtained digital 3D representation of the patient's set of teeth and the neighbor section 1214 of the set of teeth. As seen, the virtual 3D model does not intersect the teeth of the neighbor section 1214.

In FIG. 12B the virtual 3D model is moved along the insertion path 1213 and at the position illustrated in FIG. 12B, a part 1218 of the generated outer surface 1217 intersects the teeth of the neighbor section 1214. For the manufactured dental restoration this would correspond to a collision between the restoration and the neighbor teeth.

The portion of the virtual 3D model 1217 which virtually collides with the neighbor section 1214 can be found be determining a limiting volume of the digital 3D representation of the teeth. The boundary 1216 of the limiting volume follows the insertion path between the circumference of the neighbor teeth and the surface of the tooth above the circumference line. The outer surface of the virtual 3D model generated at the target site does not intersect the digital 3D representation of the teeth but it intersects the boundary 1216 of the limiting volume and the intersecting portion 1218 must be removed if a collision-free insertion path for the manufactured dental restoration to the target site is wanted.

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

A claim may refer to any of the preceding claims, and "any" is understood to mean "any one or more" of the preceding claims.

It should be emphasized that the term "comprises/comprising" when used in this specification is taken to specify the presence of stated features, integers, steps or components but does not preclude the presence or addition of one or more other features, integers, steps, components or groups thereof.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

The invention claimed is:

1. A method of designing a 3D digital model of a dental restoration, the dental restoration configured for positioning on a target site of a patient's set of teeth, said method comprising:
    obtaining a digital 3D representation of the set of teeth, said digital 3D representation comprising a section corresponding to the target site, the target site comprising a prepared tooth or an implant abutment, and a neighbor section corresponding to at least part of one adjacent tooth surrounding the target site;
    determining an insertion path for the dental restoration to the target site; and
    designing the 3D digital model of the dental restoration based on the digital 3D representation of the set of teeth, where the designing comprises generating an outer surface of the 3D digital model of the dental restoration, wherein the outer surface is adjacent to the adjacent tooth in the neighbor section, wherein the designing comprises evaluating the generated outer surface with respect to collision(s) with the neighbor section, wherein the collision is defined as an overlap with the neighbor section, the overlap being defined as a threshold value at a position along the insertion path, and modifying the generated outer surface in response to a collision during a virtual movement of the 3D digital model of the dental restoration along the insertion path such that the determined insertion path and the modified outer surface of the designed 3D digital model provide that a dental restoration manufactured from the designed 3D digital model can be moved along the insertion path to the target site.

2. The method according to claim 1, wherein the method comprises determining a limiting volume of the digital 3D representation, said limiting volume comprising a boundary.

3. The method according to claim 2, wherein the method comprises determining at least one circumference segment for the neighbor section relative to the insertion path, wherein the at least one circumference segment is located where a projection of the insertion path is tangential to the digital 3D representation, and wherein the limiting volume is determined from the circumference segment of the neighbor section.

4. The method according to claim 2, wherein designing the 3D digital model of the dental restoration comprises shaping the generated outer surface such that the modified outer surface is confined within the limiting volume or within a predetermined offset from the limiting volume.

5. The method according to claim 4, wherein the shaping comprises projecting portions of the generated outer surface which extends outside the limiting volume onto the boundary of the limiting volume such that the modified outer surface is confined within the limiting volume.

6. The method according to claim 4, wherein the shaping comprises virtually cutting away portions of the generated outer surface which extends outside the limiting volume such that the modified outer surface is confined within the limiting volume.

7. The method according to claim 4, wherein the shaping comprises projecting portions of the generated outer surface which extend further than a predetermined threshold distance away from the boundary of the limiting volume onto a virtual surface arranged at the predetermined threshold distance from the limiting surface or virtually cutting away said portions such that no parts of the 3D digital model extends further away from the boundary of the limiting volume than the predetermined threshold distance.

8. The method according to claim 2, wherein the limiting volume is determined from a line defined by an offset of the circumference segment of the neighbor section.

9. The method according to claim 2, wherein part of the boundary of the limiting volume comprises a first portion and a second portion, where the first and second portions are separated by the circumference segment, and where the first portion is at the target site.

10. The method according to claim 9, wherein the first and/or the second portion of the boundary are formed by extending the circumference segment of the neighbor section along the insertion path such that the formed surface defines the boundary.

11. The method according to claim 9, wherein a part of the second portion of the boundary is configured to follow the surface of the at least part of one tooth in the neighbor section.

12. The method according to claim 2, wherein the insertion path is shaped such that the modified outer surface of the 3D digital model is confined within the limiting volume.

13. The method according to claim 2, wherein the limiting volume is determined before the outer surface of the 3D digital model is generated.

14. The method according to claim 2, wherein the limiting volume is determined after the outer surface of the 3D digital model is generated.

15. The method according to claim 1, wherein the method comprises detecting virtual collisions between the generated outer surface of the 3D digital model and the digital 3D representation of the set of teeth when moving the 3D digital model to or from the target site along the insertion path.

16. The method according to claim 15, wherein designing the 3D digital model comprises modifying the generated outer surface such that the detected virtual collisions are avoided or their extent is lowered to a predetermined threshold value.

17. The method according to claim 1, wherein designing the 3D digital model of the dental restoration comprises evaluating whether the generated outer surface is such that the 3D digital model can be virtually moved to the target site along the insertion path without having an overlap with the neighbor section, which exceeds a threshold value at any position along the insertion path, and if the overlap exceeds the threshold value then shaping the generated outer surface of the 3D digital model of the dental restoration such that the overlap with the neighbor section is below the threshold value.

18. The method according to claim 17, wherein said threshold value relates to a maximum penetration depth, a maximum volume of the overlap, or a maximum displacement angle of teeth in the neighbor section.

19. The method according to claim 1, wherein the method is an iterative process wherein the outer surface of the 3D digital model and/or the insertion path are modified one or more times.

20. A non-transitory computer readable medium for designing a 3D digital model of a dental restoration, the dental restoration configured for positioning on a target site of a patient's set of teeth, where the non-transitory computer readable medium is configured to enable a hardware process to perform a method comprising:
    obtaining a digital 3D representation of the set of teeth, said digital 3D representation comprising a section corresponding to the target site, the target site comprising a prepared tooth or an implant abutment, and a neighbor section corresponding to at least part of one tooth surrounding the target site;
    determining an insertion path for the dental restoration to the target site and a neighbor section corresponding to at least part of one adjacent tooth surrounding the target site;
    designing the 3D digital model of the dental restoration based on the digital 3D representation of the set of teeth, where the designing comprises generating an outer surface of the 3D digital model of the dental restoration, wherein the outer surface is adjacent to the adjacent tooth in the neighbor section, wherein the designing comprises evaluating the generated outer surface with respect to collision(s) with the neighbor section, wherein the collision is defined as an overlap with the neighbor section, the overlap being defined as a threshold value at a position along the insertion path, and modifying the generated outer surface in response to a collision during a virtual movement of the 3D digital model of the dental restoration along the insertion path such that the determined insertion path and the modified outer surface of the designed 3D digital model provide that a dental restoration manufactured from the designed 3D digital model can be moved along the insertion path to the target site.

* * * * *